UNITED STATES PATENT OFFICE.

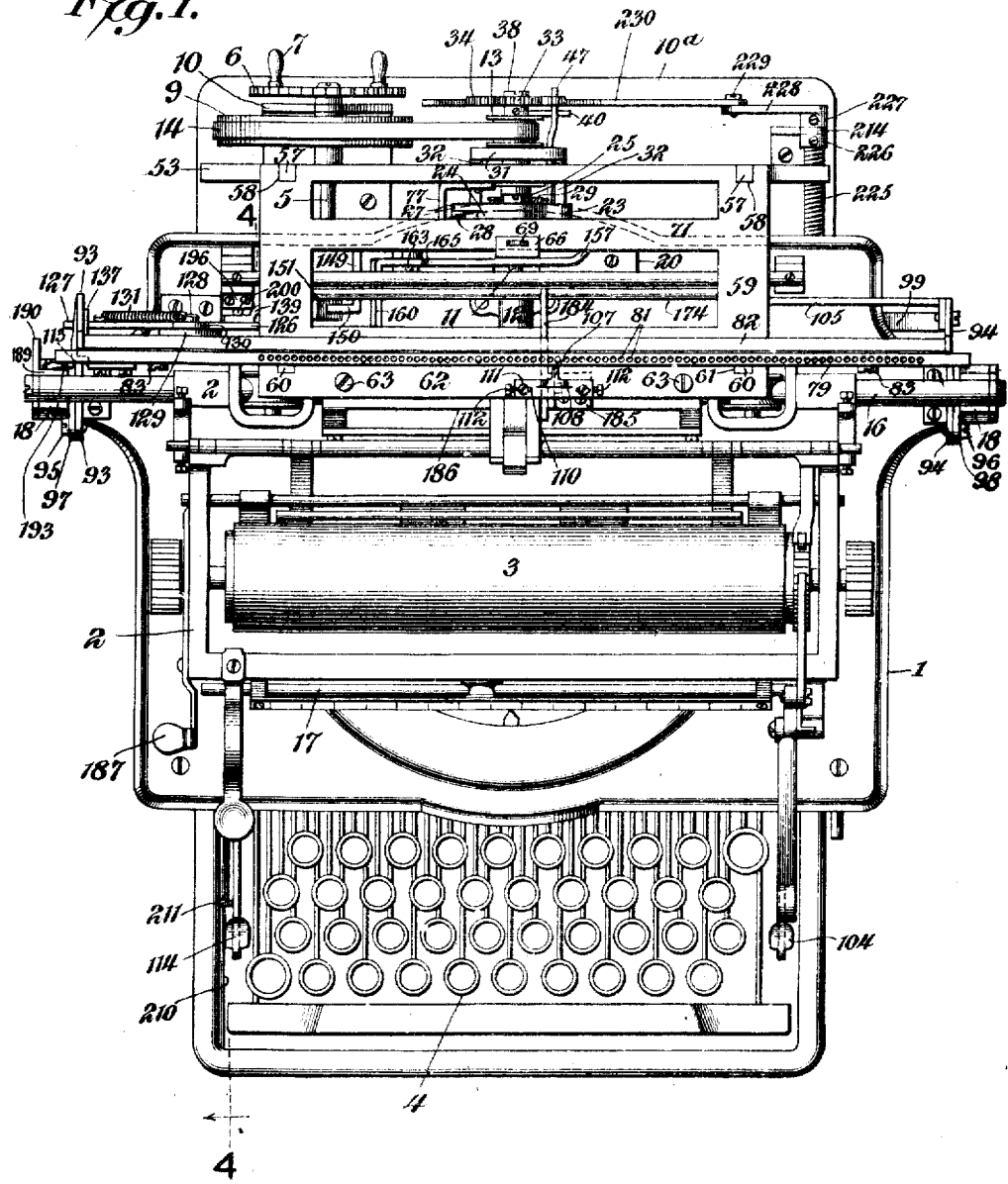

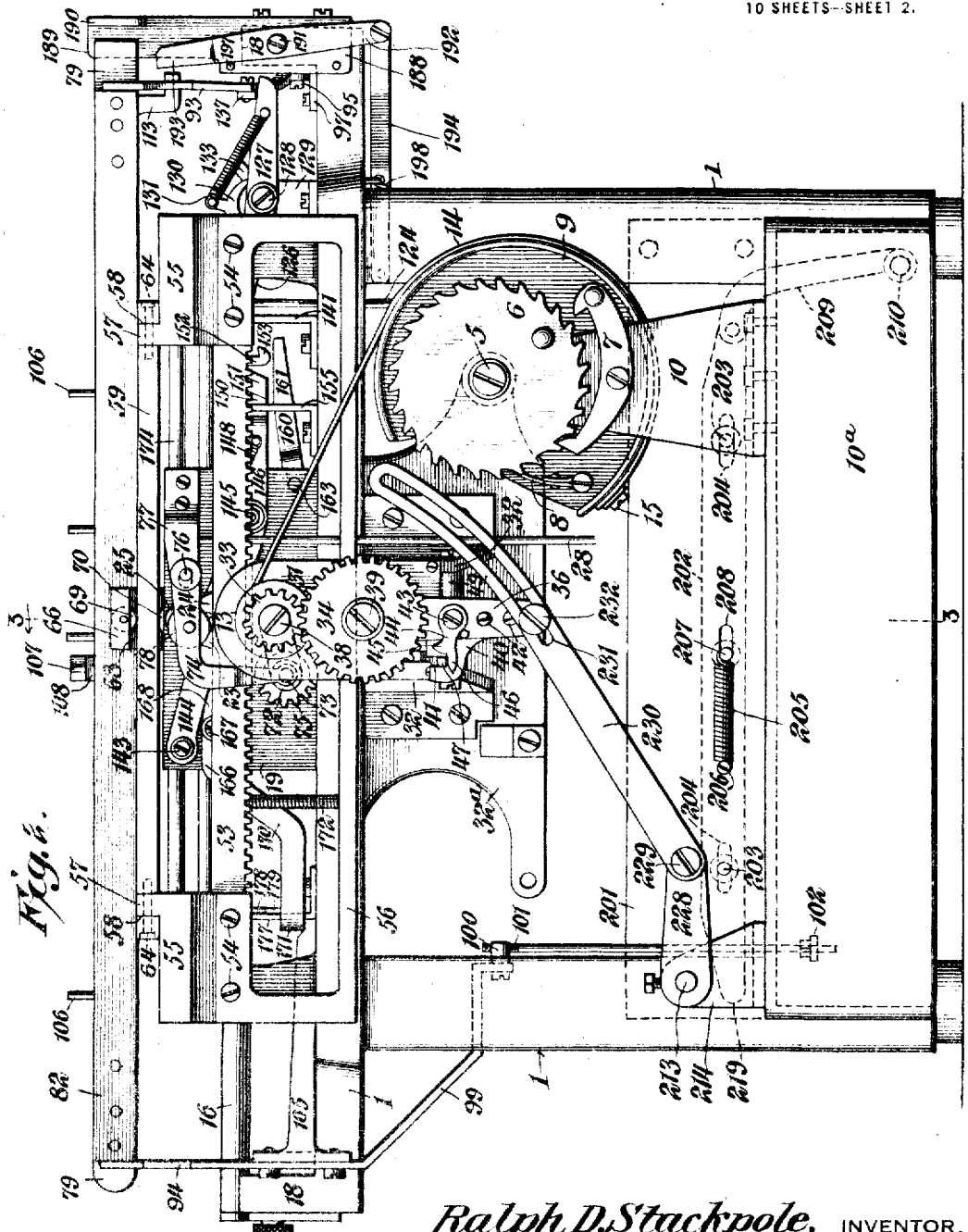

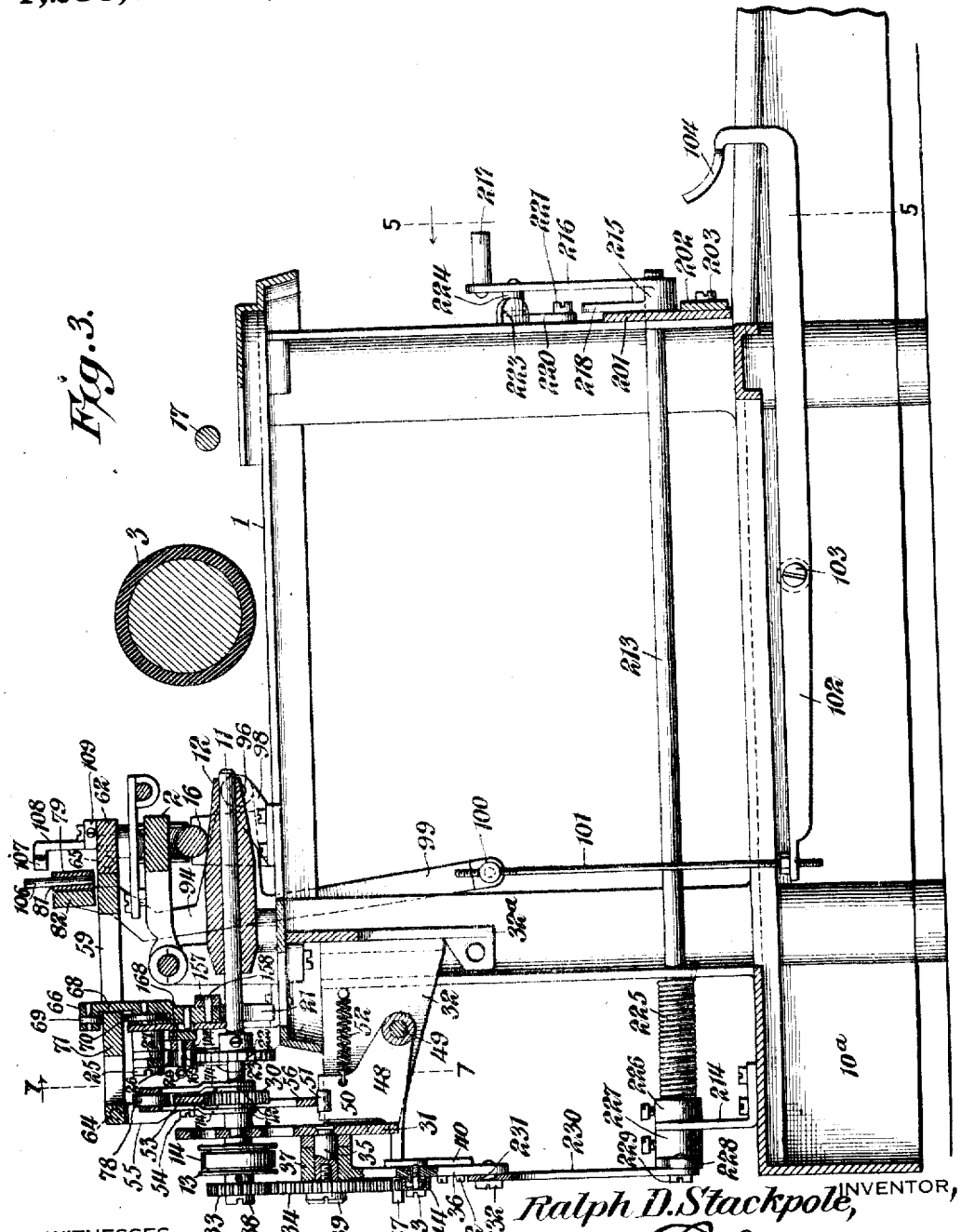

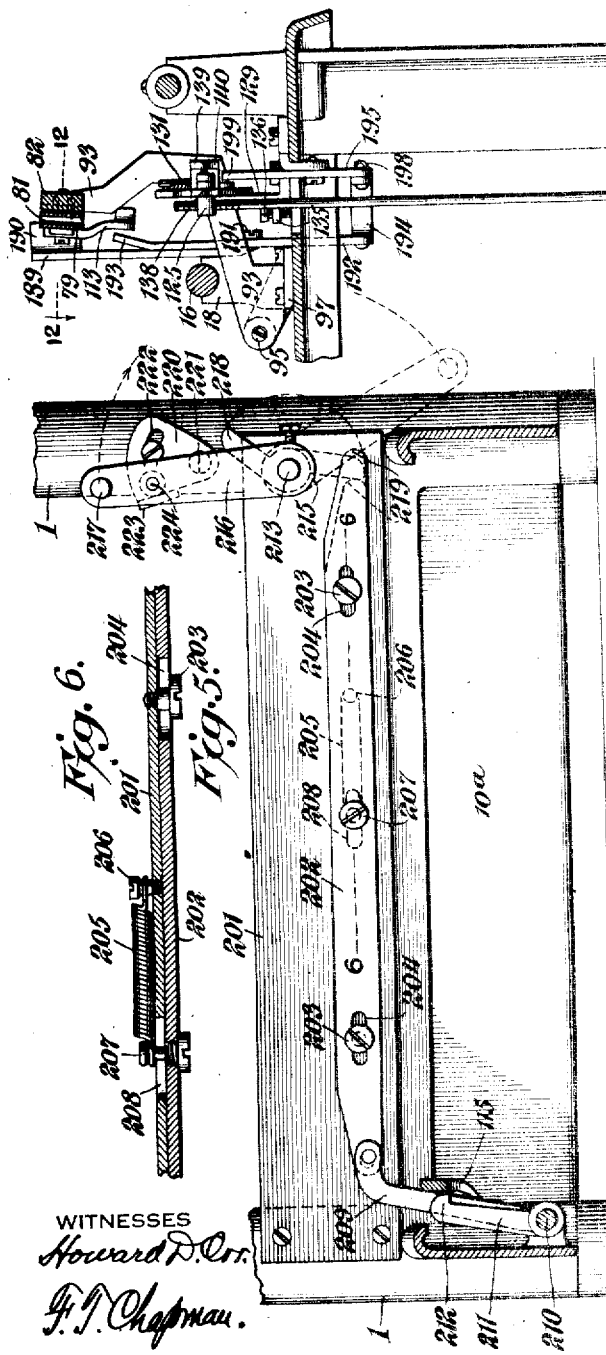
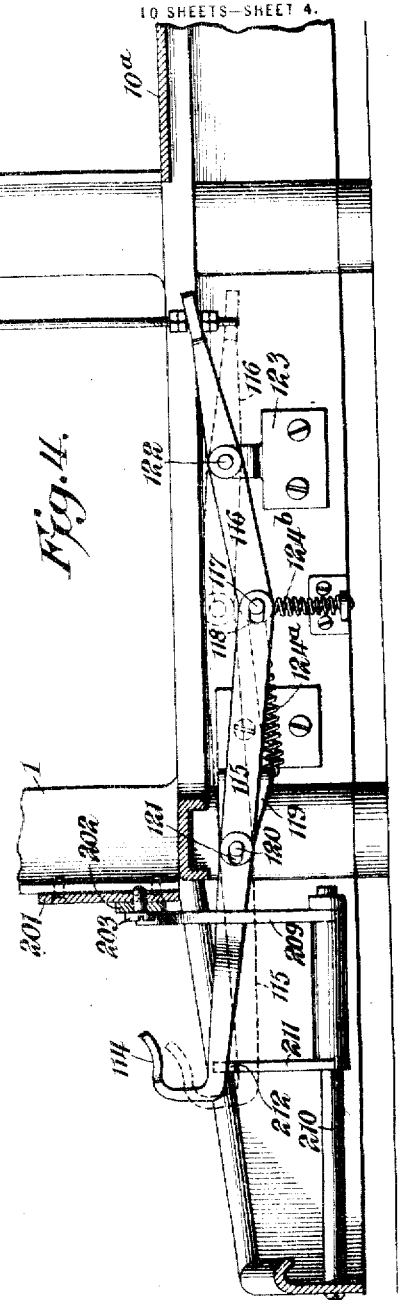

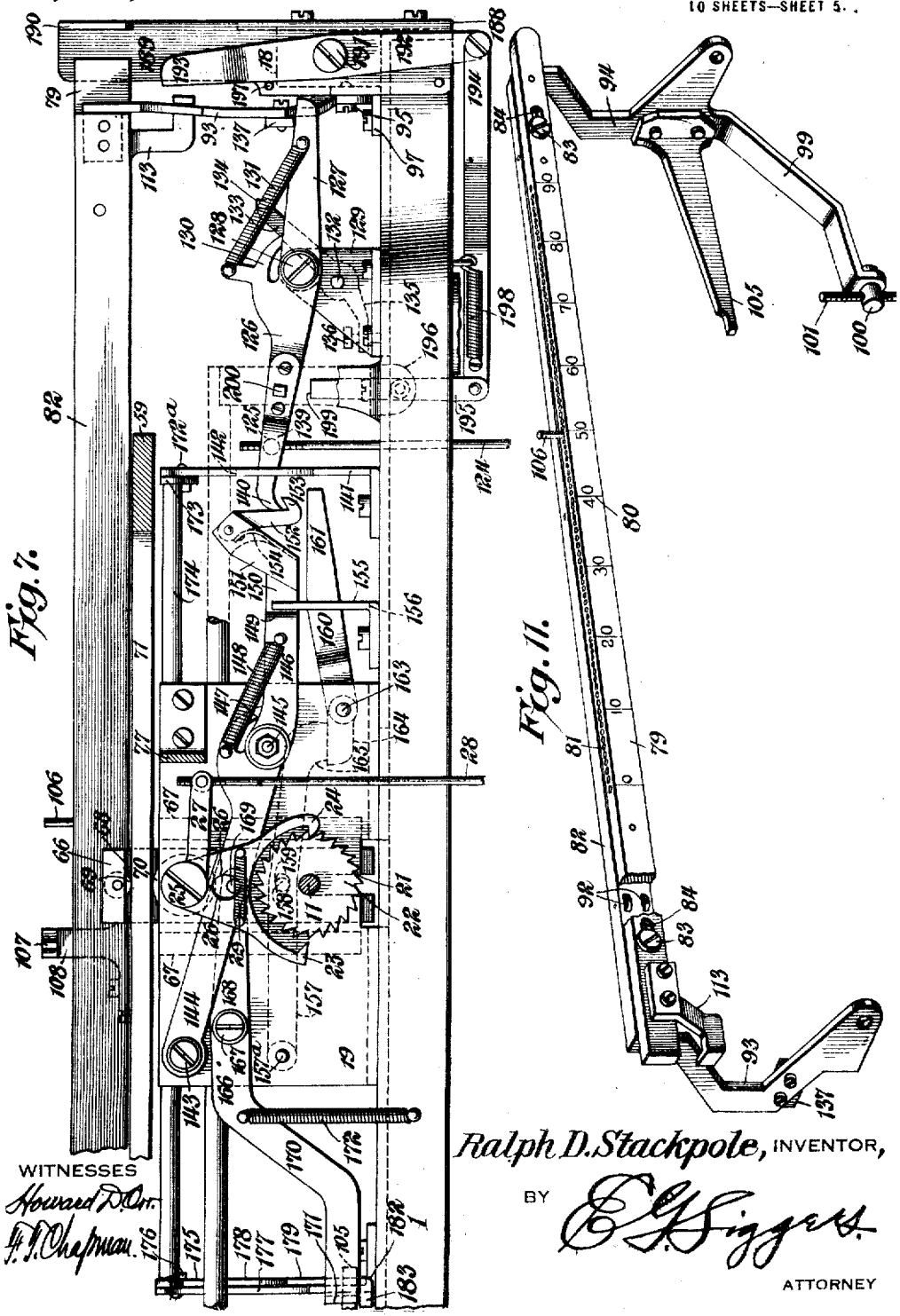

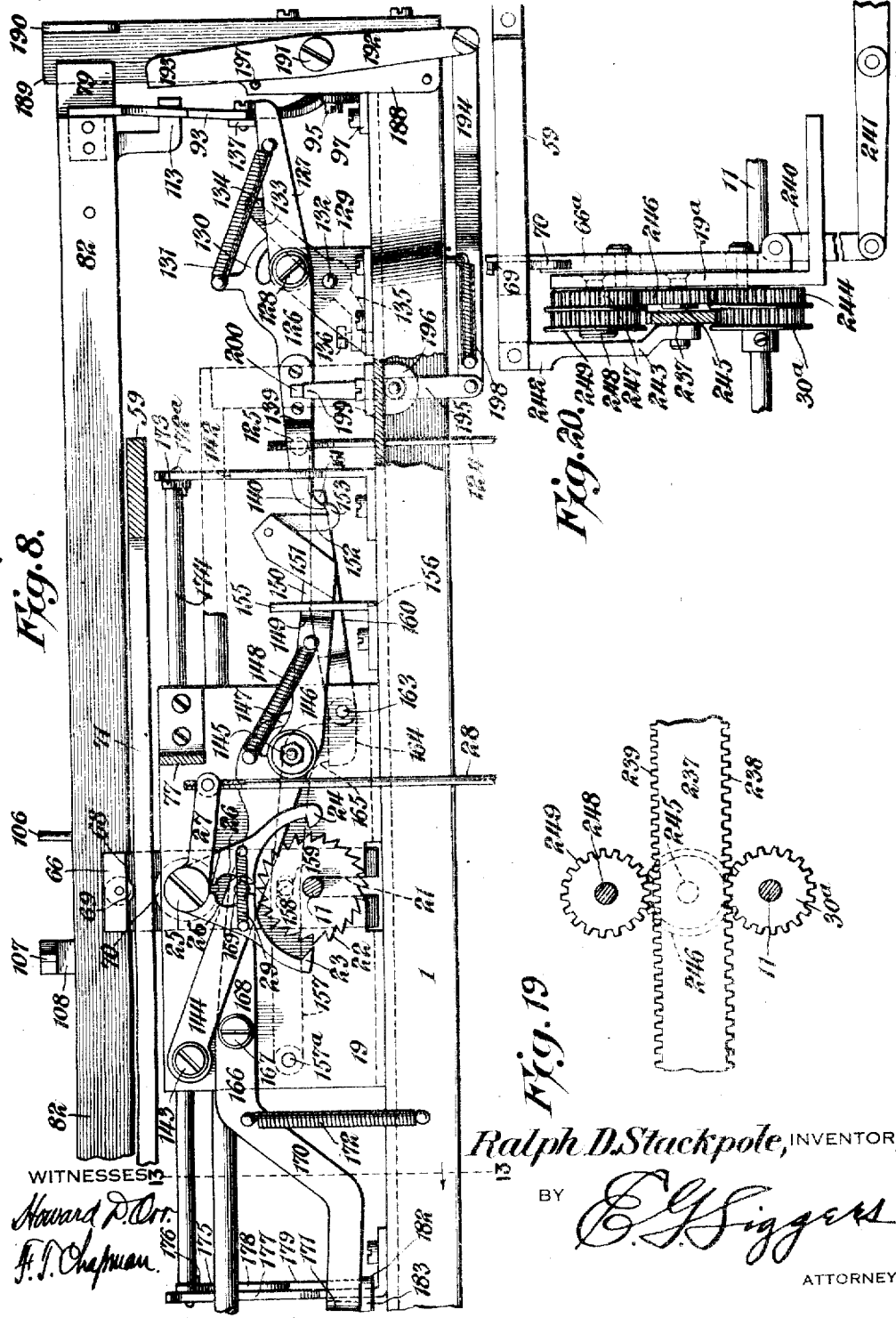

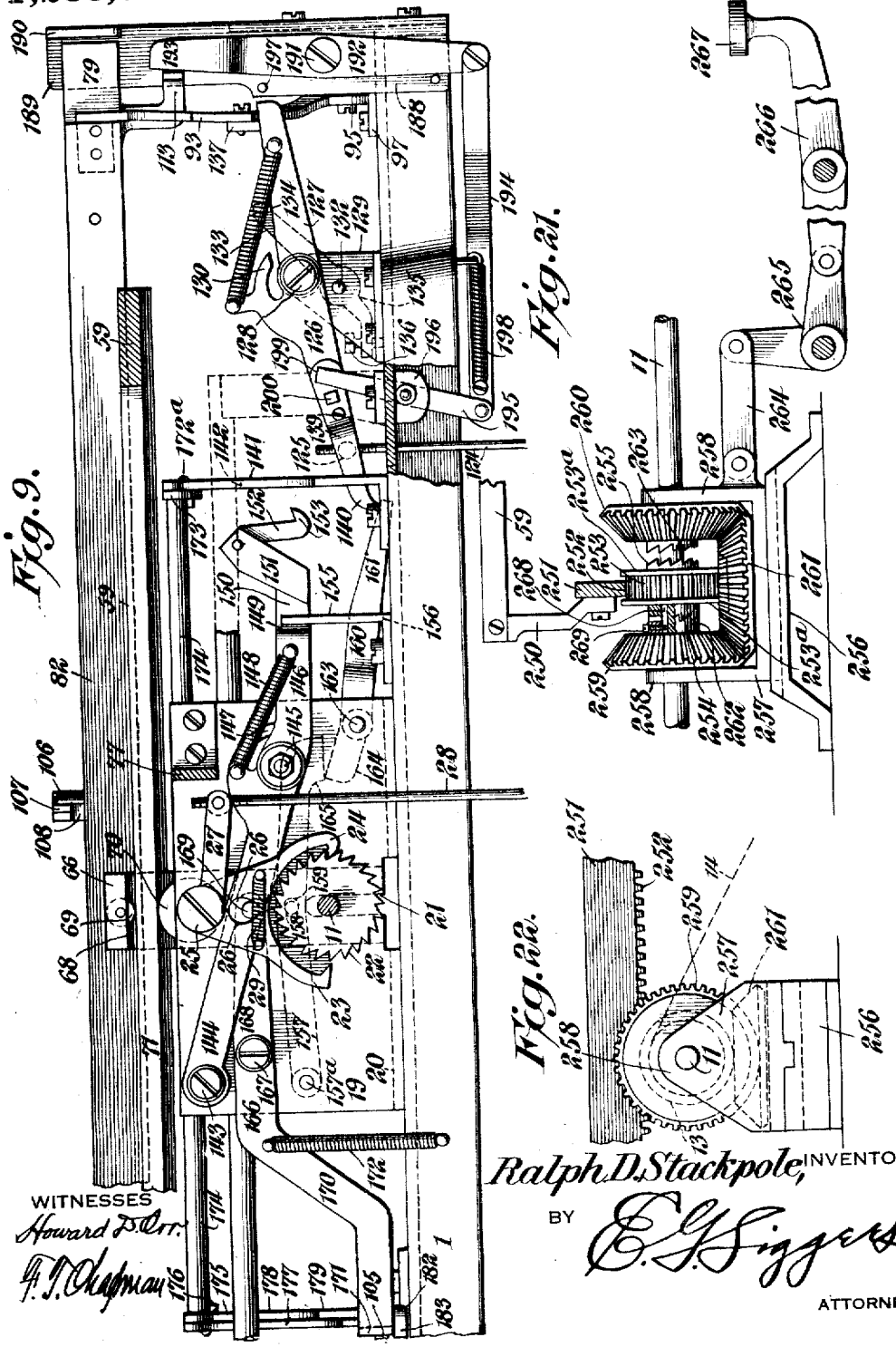

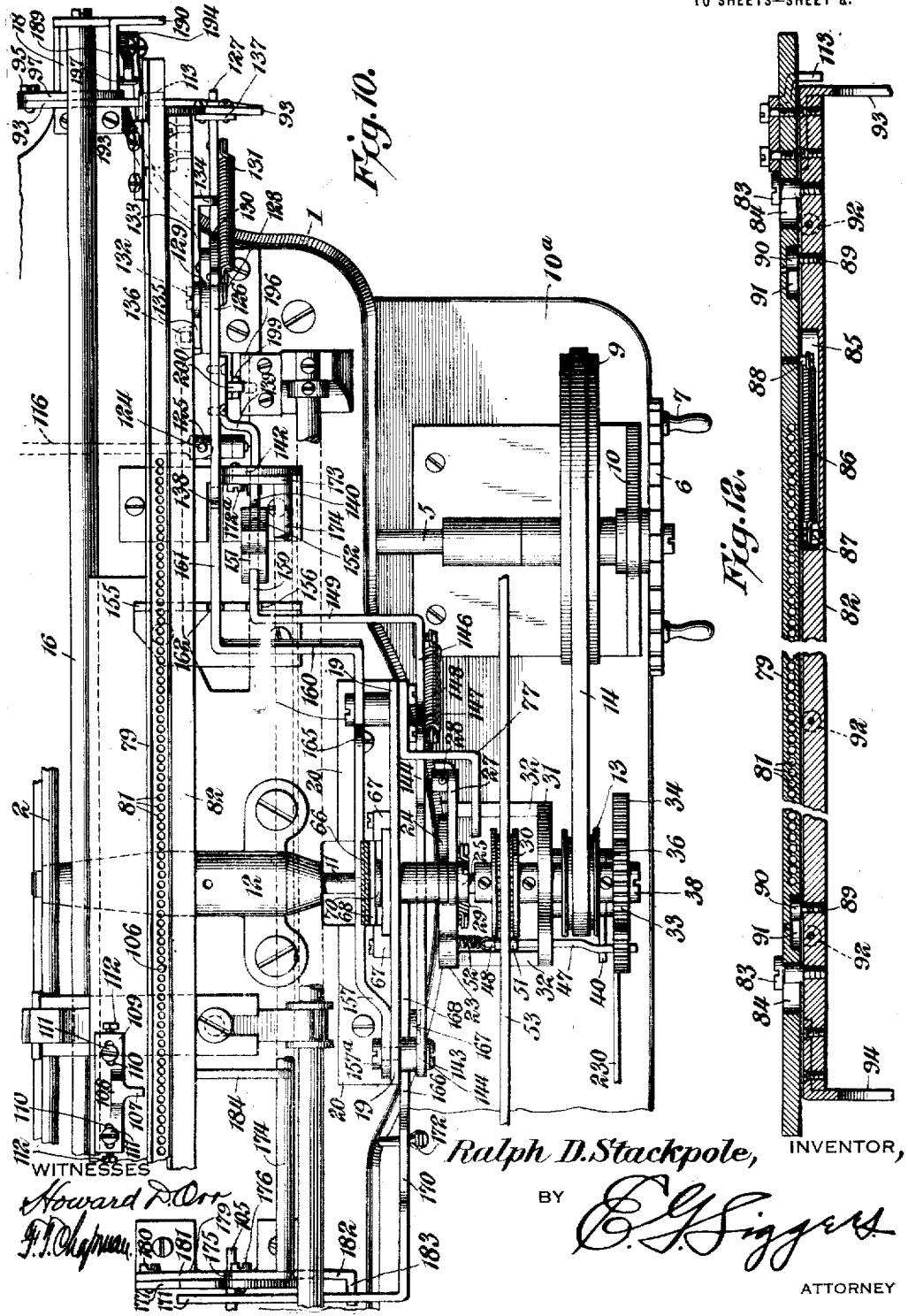

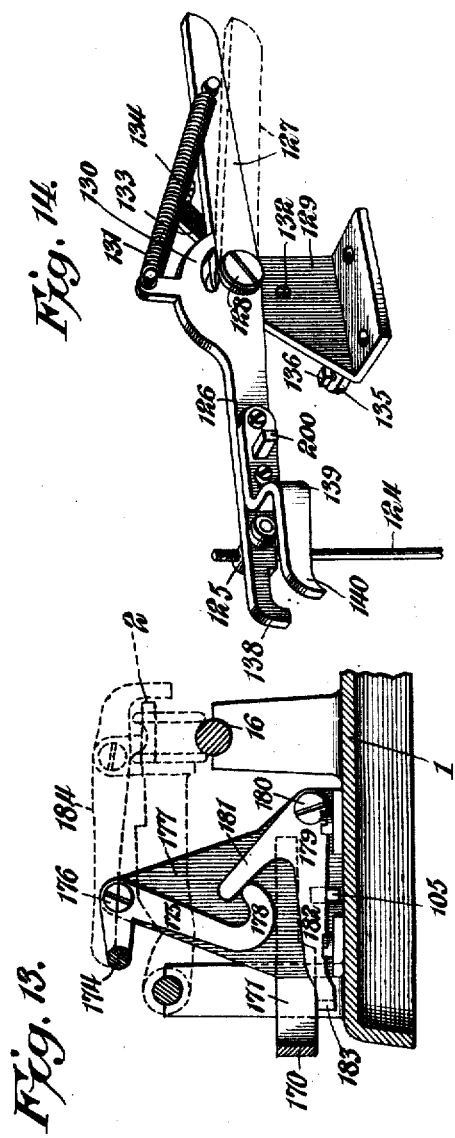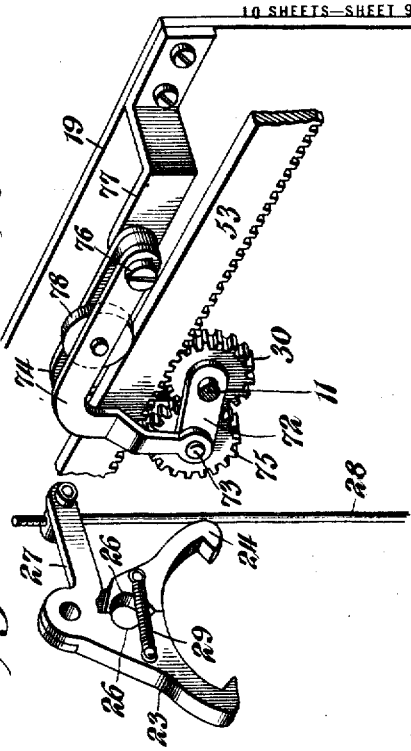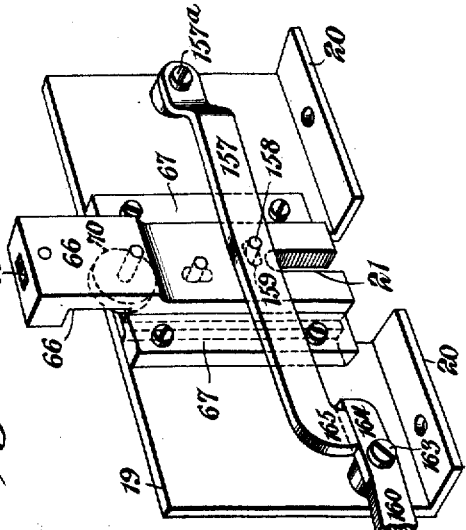

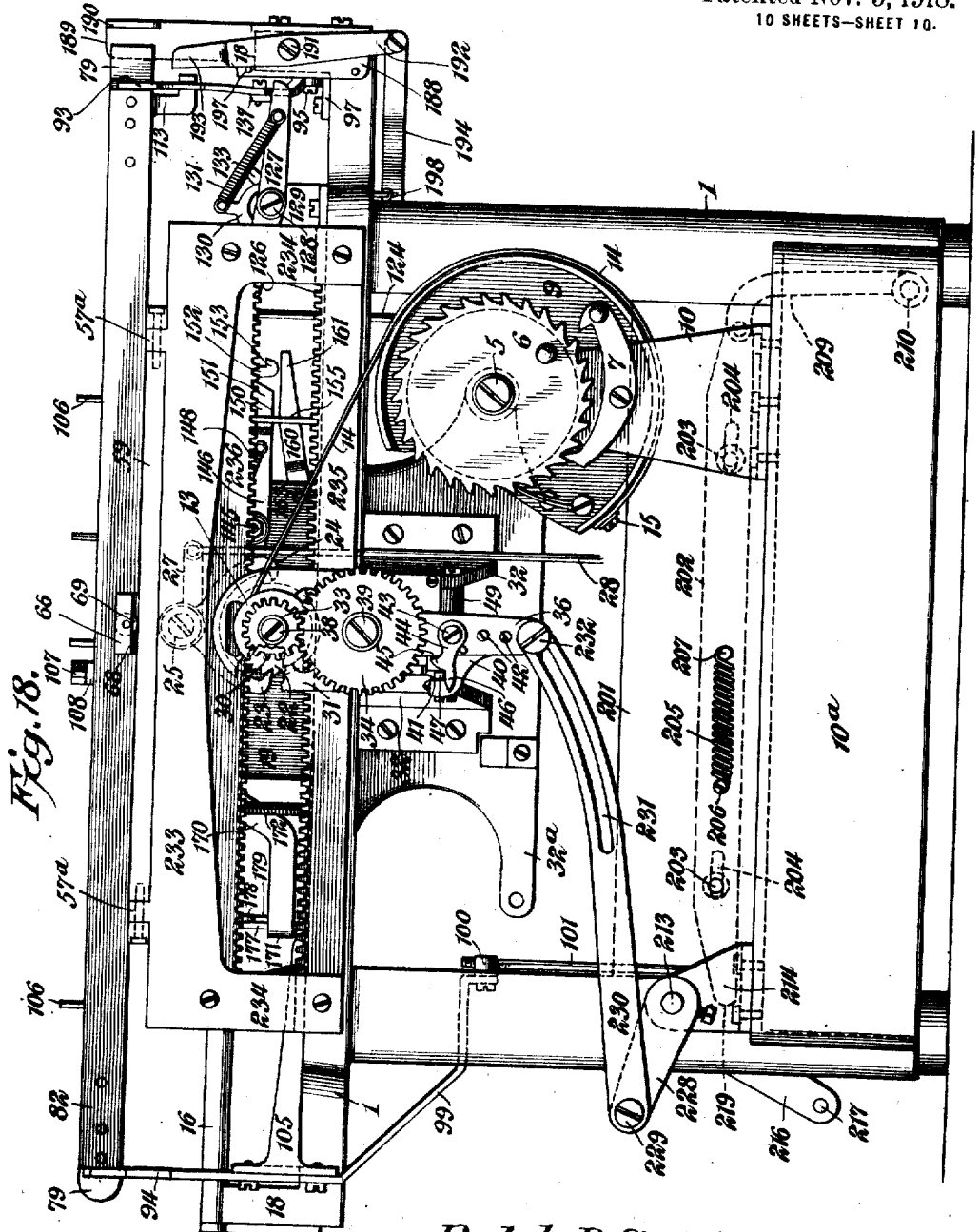

RALPH D. STACKPOLE, DECEASED, LATE OF CANTON, OHIO, BY ELIZABETH STACKPOLE, ADMINISTRATRIX, OF CANTON, OHIO, ASSIGNOR OF ONE-HALF TO CHARLES G. MOHRLE, OF YOUNGSTOWN, OHIO.

TABULATOR FOR TYPE-WRITERS.

1,283,586.      Specification of Letters Patent.      Patented Nov. 5, 1918.

Substitute for abandoned application Serial No. 830,758, filed April 9, 1914. This application filed May 16, 1918. Serial No. 235,040.

*To all whom it may concern:*

Be it known that I, ELIZABETH STACKPOLE, a citizen of the United States, residing at Canton, county of Stark, State of Ohio, administratrix of the estate of RALPH D. STACKPOLE, late a citizen of the United States, and a resident of Canton, in the county of Stark and State of Ohio, deceased, (as by reference to the duly certified copy of letters of administration hereto annexed will more fully appear,) do hereby declare that the said RALPH D. STACKPOLE invented a new and useful Improvement in Tabulators for Type-Writers, of which the following is a specification.

This invention has reference to improvements in typewriting machines of the power-actuated-carriage class, and its object is to provide for the feeding of the carriage in either direction to any desired extent, from predetermined points, and particularly for permitting the operator to produce columns of figures or other similarly associated indicia where certain, and particularly terminal parts of the groups of figures should come directly one under the other.

The present invention is especially useful in writing columns of figures denoting values where the decimal points or those portions of the amounts represented which would agree with the decimal points should all be in the same upright column.

By the present invention the desired object is attained by means of a tabulator and appropriate mechanism connected therewith, together with means for reversing the direction of feed of the carriage, and the arrangement is such that the carriage stops at what may be termed the decimal side of the column, and then feeds in the opposite direction to its normal feeding movement, the operator writing the desired amount backwardly, that is, writing in the order of units, tens, hundreds, etc.

It is an important feature of the present invention that the tabulator bar and the reversing mechanism are under the control of a single key, so that the carriage is released to move as far as the present position on the tabulator bar, and then the feeding mechanism is reversed with respect to the carriage, and the parts are locked in such position so long as the reversal of the movement of the carriage is desired.

Subordinate to this feature the invention provides a take-up mechanism so arranged that upon resetting the feed mechanism to cause the carriage to resume its customary direction of travel, the power consumed in the reverse travel of the carriage is compensated for or restored, wherefore the propelling spring is always under the same degree of tension which it has in the ordinary normal action of the typewriter.

The restoring mechanism is by the present invention utilized for unlocking the reversing mechanism when it is desired to again place the carriage in position for normal operation, the common operating key for the feeding mechanism and tabulator bar being locked in the operated position for reversing the direction of feed.

The invention also includes means associated with the common controlling key for the tabulator bar and feed reversing mechanism, whereby the manipulation of the key first moves the tabulator bar into operative position and releases the carriage, and then further movement of the key in the active direction is arrested until the carriage reaches the full limit of its predetermined movement after release, whereupon by means of mechanism responsive to the momentum of the carriage the key is permitted to move progressively for a farther distance, thereby bringing about the setting of the carriage feed in a manner to cause the carriage to move in the reverse direction to its normal direction of movement under the otherwise ordinary operation of the typewriter. The parts controlled by the key under consideration are maintained in the actuated position by a suitable lock which may be made responsive to the before mentioned power restoring or compensating mechanism.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention, as claimed.

In the drawings:—

Figure 1 is a plan view of a known form of typewriting machine with the improvement of the present invention applied.

Fig. 2 is a rear elevation of the structure shown in Fig. 1, some distant parts belonging to the known typewriter being omitted.

Fig. 3 is a section on the line 3—3 of Fig. 2, also omitting distant parts and some parts having no direct connection with the present invention.

Fig. 4 is a section on the line 4—4 of Fig. 1 but drawn on a larger scale.

Fig. 5 is a section on the line 5—5 of Fig. 3.

Fig. 6 is a section on the line 6—6 of Fig. 5.

Fig. 7 is a section on the line 7—7 of Fig. 3, showing certain parts in normal position.

Fig. 8 is a section similar to that of Fig. 7, but showing the parts in an intermediate operative position during the operation of the carriage feed direction-changing mechanism.

Fig. 9 is a section similar to Fig. 7 but showing the final position of the parts at the completion of the operation of the carriage feed reversing mechanism.

Fig. 10 is a fragmentary plan view of the rear portion of the machine on a larger scale than that of Fig. 1 and with some of the parts shown in Fig. 1 omitted.

Fig. 11 is a perspective view of the tabulator bar and the supports or carriers therefor.

Fig. 12 is a section of the tabulator bar on the line 12—12 of Fig. 4.

Fig. 13 is a detail section on the line 13—13 of Fig. 8.

Fig. 14 is a perspective view of a broken lever structure.

Fig. 15 is a perspective view of the rack carrying slide and adjacent parts.

Fig. 16 is a perspective view of the escapement dogs.

Fig. 17 is a perspective view of the direction-changing gearing for the rack.

Fig. 18 is a rear elevation similar to Fig. 2 but showing a modified form of some parts of the carriage feed reversing mechanism.

Fig. 19 is a fragmentary elevation with some parts in section of another modified form of a portion of the carriage feed mechanism.

Fig. 20 is an end elevation with some parts in section of the modified structure of Fig. 19, some parts being illustrated that are not shown in Fig. 19.

Fig. 21 is a fragmentary end elevation with some associated parts in section of a still further modified form of a portion of the carriage feed mechanism.

Fig. 22 is a side elevation of a portion of the structure shown in Fig. 21.

The present invention is shown in the drawings as applied to a known form of typewriting machine, the special construction of typewriter shown being that known in the trade as Remington No. 6, but it will be understood that the structure is susceptible of many changes adapting it to different forms of typewriter machines other than the particular one illustrated, and this without any material change in the principal features of the invention and embodying only such mechanical variations in form, relation and proportions of the parts as may be demanded in the adaptation of the invention to other constructions of typewriting machines.

In the machine shown there is a main frame 1, a carriage 2 including the usual platen or roller 3, and a keyboard 4. In the drawings many of the parts entering into the ordinary construction of the typewriter have been omitted as unnecessary for an understanding of the invention, and which if shown would only serve to confuse the illustration of those parts particularly included in the present invention.

In the particular showing of the drawings there is indicated a spring arbor 5, spring ratchet wheel 6, double-acting pawl 7, spring 8, and incomplete volute band wheel 9, all as ordinarily present in the particular form of typewriting machine illustrated, but instead of the spring and associated parts being mounted inside of the frame 1, the arbor 5, has a journal support upon a bracket 10 erected on the usual rear extension 10ª of the main frame provided for the housing of the pivot supports of the keys of the key-board 4. Because of the rearward displacement of the spring and associated parts in the particular arrangement of the structure illustrated in the drawings, the arbor 5 is correspondingly elongated, so that it may, as is customary in the particular form of typewriter shown in the drawings, actuate the ribbon feed, but such feed having nothing to do with the present invention, is not illustrated.

Likewise there is provided an escapement arbor 11 mounted in an elongated journal bearing 12 secured on top of the frame 1, as is customary, but the arbor 11 is made longer than usual to provide for the rearward displacement of the spring and associated parts, and made fast to this arbor near its rear end is a pulley 13 to which is secured one end of a band or strap 14, the other end of this strap being secured to the rim of the wheel 9 by a screw 15, as is customary. It is usual to fasten the strap 14 directly to the carriage of the typewriter, but in the structure of the present invention the band or strap acts directly on the escapement arbor through the pulley 13 to rotate such arbor, and by mechanism to be described the rotative movements of the arbor are imparted to the typewriter carriage in a manner to move the same on the usual supporting tracks provided for the purposes, these tracks being indicated at 16 and 17, respectively, but being common to typewriting machines need no particular description. The track 16 is supported at the ends upon upstanding posts 18 usually cast on the top of the frame 1.

At the rear portion of the top of the frame 1 and midway of the length thereof there is secured an upstanding plate 19 provided with an angle foot or base portion 20 by means of which the plate is made fast to the top of the frame of the machine by screws or otherwise. The arbor 11 passes freely through the plate 19 by way of a slot 21, and adjacent to the rear face of the plate 19 the arbor 11 carries an escapement ratchet wheel 22 with which engage escapement dogs 23, 24 on opposite sides of the arbor 11, these dogs being pivotally hung on a screw stud 25 carried by the plate 19 at an appropriate distance above the arbor 11. The dogs 23 and 24 between their pivot support 25 and the escapement ratchet 22 have matching and facing recesses 26 approaching toward the ratchet wheel. One of the dogs, say, the dog 23, is provided with an offstanding arm 27 at an angle to the length of the dog, and this arm is connected to a pull rod 28 leading to the escapement controlling members of the typewriter, so that on the actuation of the keys of the keyboard the escapement will be operated in the usual way. The dogs are elastically held one in contact with the other adjacent to the recesses 26 by a connecting spring 29 permitting the separation of the dogs under circumstances to be described.

The escapement dogs 23 and 24 are under the control of certain mechanism forming part of the present invention, which mechanism, its manner of operation, and the functions performed, will be described hereinafter, it being understood that the escapement is operated for releasing the carriage to the power spring 8 for step by step movement in the usual manner of operation of a typewriter, and also for releasing the carriage for more extended movements when it is desired to permit the carriage to make the required movements for tabulating purposes.

Fast on the escapement arbor 11 between the escapement ratchet wheel 22 and the pulley 13 there is a gear pinion 30, and between the pinion 30 and the pulley 13 the arbor 11 extends through a bearing formed in an upright plate 31 carried by brackets 32 made fast to a fixed part 32ª of the main frame 1. At the rear or outer end of the arbor 11 and exterior to the pulley 13 there is secured a pinion 33 in mesh with a gear wheel 34 mounted on a stud 35 carried by the plate 31, the said stud forming a journal bearing for a rock arm 36 having a hub 37 at one end through which the stud 35 extends. While the pinion 33 and gear wheel 34 may be secured in place against accidental removal in any suitable way, screws 38 and 39 respectively constitute convenient means for holding the pinion 33 fast to the arbor 11 and the gear wheel 34 upon the stud 35 so as to be rotated thereon by the pinion 33. The arm 36 has a laterally offset portion 40 provided on the edge toward the pivot end of the arm 36 with a recess 41. While the portion 40 may be made in one piece with the arm 36, it may be made separately therefrom and secured thereby by screws 42 or otherwise. Pivotally mounted on the arm 36 by means of a pivot screw 43 or any other appropriate manner, is a pawl 44 having a tooth 45 arranged to engage between the teeth of the gear wheel 34, and the pawl 44 is continued beyond the tooth 45 to form a nose 46 extended across the recess 41. Arranged to move into and out of the recess 41 when the arm 36 is in a certain position and when lodged in the recess 41 arranged to hold the arm against rocking movements, is a finger 47 projecting from a rock member 48 pivoted at the end remote from the finger 47 on a rod 49 carried by the brackets 32. The rock member 48 is provided with an angle extension 50 carrying a roller 51 so located as to extend above the plane of the upper edges of the brackets 32, and the rock member 48 is constrained to move in one direction by a spring 52 fast at one end to the rock member and at the other end to one of the brackets 32. The normal tendency of the finger of the rock member 48 under the action of the spring 52 is to rise out of the recess 41. The purpose of the rock arm 36 and the parts described with reference thereto will appear hereinafter.

It is customary in typewriters of the general class to which the present invention relates to employ a rack bar for the control of the movements of the carriage by the power spring as permitted by the action of the escapement. In connection with the present invention there is provided a rack bar 53 made fast at the ends by screws 54, or otherwise, in return end members 55 of an elongated rectangular frame having one long side member 56, which may be in one piece with the end members 55, while the other long side of the frame in the main consists of the rack bar 53, the teeth of which are directed toward the side member 56 of the frame. The rack frame is so related to the gear pinion 30 that under normal writing conditions the teeth of the rack 53 mesh with the gear 30, the rack 53 being in overriding relation to the gear. When the rack is thus located the long side 56 is in engagement with the roller 51 and the rock member 48 is moved against the action of the spring 52 so that assuming the bracket 40 on the arm 36 to be in the proper position, the finger 47 is within the recess 41 and is in engagement with the nose 46 moving the tooth 45 out of contact with the gear wheel 34. Under these circumstances the gear wheel 34 rotates idly under the action of the pinion 33.

The ends 55 of the frame carrying the rack 53 have upstanding lugs 57 engaging in correspondingly positioned recesses 58 in a frame 59 constituting a carrier or support for the rack frame, which latter depends from the rear edge of the frame 59, which is approximately horizontal. The front edge of the frame 59 is formed with lugs 60 entering recesses 61 in and near the ends of a bar 62 made fast by screws 63 to the carriage 2, so as to participate in the travel of the carriage caused by the action of the spring 8 through the arbor 11, gear pinion 30 and rack 53. The frame end members 55 are secured to the frame 59 by screws 64 extending through the lugs 57, and the frame 59 is in turn secured to the bar 62 by screws 65 extending through the lugs 60, but the frame 59, which may be a generally rectangular frame, is so secured to the bar 62 that it may swing slightly upon the bar 62, the screws 65 and lugs 60 forming limited hinge connections of the frame 59 with the bar 62. This permits a lifting of the rack 53 out of mesh with the gear pinion 30, so that the carriage is then no longer controlled in its movements by engagement of the gear wheel 30 and rack 53, this being for a purpose which will presently appear.

Mounted on the front face of the plate 19, that is, the face toward the front of the machine and away from the escapement wheel 22, is a slide 66 held to the plate by undercut guide bars 67, so that the slide may move up and down on the plate 19 as a support. Near the upper end the slide is provided with a transverse recess 68 entered on one side by a roller 69 mounted in the slide 66 and on the other side by another roller 70 also mounted in the slide 66, and these rollers engage opposite faces of an intermediate bar 71 forming part of the frame 59.

Mounted at one end pivotally on the arbor 11 are links 72 straddling the gear pinion 30, and these links at the other end are pivoted to a pin 73 traversing the corresponding ends of angle arms 74 carrying between them on the pin 73 a gear pinion 75 located in the space between the rack bar 53 and the side members 56 of the rack bar frame, the height of the frame being sufficient to permit the pinion 75 to turn with the links upon the arbor 11 as a center into and out of mesh with the rack bar 53.

The angle arms 74 are pivotally mounted at the ends remote from the pinion 75 upon a pivot pin 76 carried by a bracket 77 fast on the plate 19, and the pivot connection is so arranged as to permit a little play of the arms 74 thereon. Mounted between the arms 74 intermediate of their angle and the pivot 76 is a roller 78 so located as to engage that edge of the rack bar 53 remote from the teeth of the rack bar. The arrangement is such that when the rack bar is moved away from the pinion 30 by mechanism to be described, and for a purpose to be described, the engagement of the rack bar with the roller 78 causes a rocking movement of the arms 74, in turn moving the pinion 75 into mesh with the teeth of the rack bar 53 just before the rack bar moves out of mesh with the pinion 30, but the links 72 are of such length that the pinion 75 is always in mesh with the pinion 30, and consequently the rack bar is always under the control of the spring 8. When the rack bar is in mesh with the pinion 30 the carriage is propelled by the spring 8 in one direction, this being the ordinary or normal direction of travel of the carriage during the operation of typewriting. When the pinion 75 is in mesh with the rack then the direction of movement of the rack and the carriage is the reverse of that caused by the direct engagement of the pinion 30 with the rack 53, wherefore under such circumstances the direction of travel of the carriage under the action of the spring 8 is reversed, but all the other parts of the typewriter operate in the normal manner.

Since the present invention has to do with tabulating mechanism there is provided a tabulator bar 79 provided with an index 80 and with a longitudinal series of perforations or sockets 81, in this respect being similar to known forms of tabulator bars. The present invention with respect to the tabulator bar differs from other structures in that the bar 79 is provided with a longitudinal supporting strip 82 to which it is connected by screws 83 or otherwise extending through longitudinal slots 84 in the bar 79, so that the bar 79 has a limited range of longitudinal movement equal to the length of the slots 84. Housed in a longitudinal pocket 85 in the strip 82 is a spring 86 connected at one end by a stud 87 to the strip 82, and at the other end by a stud 88 to the bar 79, the spring tending at all times to maintain the bar at one limit of its travel. Mounted on studs 89 carried by the strip 82 are rollers 90 entering elongated pockets 91 in the bar 79, and other rollers 92 seated in the strip 82 hold the bar 79 in slightly spaced relation to the strip 82, so that the bar 79 is almost wholly supported with respect to the strip 82 by anti-friction means, wherefore the movement of the bar 79 along its supporting strip 82 is extremely easy.

The strip 82 is supported at the ends by angle arms 93, 94, respectively, each arm being connected at one end to a respective end of the strip 82, and at the other end pivotally mounted as by screws 95 and 96, respectively, on respective brackets 97 and 98 made fast to the top of the main frame 1, by screws or otherwise.

In the particular arrangement shown in the drawings the angle arms 93 and 94 are approximately U-shaped, so as to extend around certain parts of the particular machine to which the invention is shown as applied, but such particular shape is not necessary in all styles of typewriter machines, nor is it essential that the supporting arms be angle arms when employed in other styles of typewriter machines. The supporting angle arm 94 is shown as provided with an extended portion 99 carrying at its free end a swivel nut 100 into which is screwed one threaded end of a link 101, the other end being engaged by the corresponding end of a key lever 102 pivotally supported on the main frame by a pivot screw 103, and this key lever is of a length to have the key end 104 located within the space provided for the keyboard of the machine. In the particular structure shown in the drawings this key is located at the right hand end of the keyboard as viewed by the operator. The angle arm 94 has also secured to it an elongated finger 105, this finger extending in a direction lengthwise of the bar 79, and is provided for a purpose which will hereinafter appear. The bar 79 may be provided with a suitable number of pins 106 adapted to any of the pin-receiving holes or sockets 81, and these pins are designed to coact with an overhanging stop member 107 on the upper end of a post 108 made fast to the bar 62 at an appropriate point thereon. The post 108 has a foot portion 109 with elongated slots 110 for the passage of fastening screws 111, while set screws 112 carried by the foot portion 109 and entering the slots 110 provide for the accurate adjustment of the stop finger 107 with respect to the tabulator bar 79.

Since the strip 82 and the bar 79 constitute in effect, except for the limited movement of the bar 79 on the strip 82, a compound tabulator bar with one member longitudinally movable for a very limited distance on the other, and with the strip constituting the support for the movable pin carrying member, the term tabulator bar, or compound tabulator bar, will be used hereinafter as generally descriptive of the rockable member carried by the rockable angle arms 93 and 94 which in turn are pivotally supported by the pivots 95 and 96. The arrangement of the tabulator bar is such that upon depressing the key 104 the tabulator bar is rocked toward the front of the machine, so that the pin or pins 106 are then in the path of the stop finger 107, and on the opening of the escapement the typewriter carriage is free to move under the action of the spring 8 in its usual or forward direction of travel until the stop 107 engages a pin 106 in its path, and further movement of the carriage is thereby arrested.

At the end of the longitudinally movable member 79 of the tabulator bar there is secured a finger 113, which, as will hereinafter appear, operates as an actuating finger for certain mechanism to be described.

In accordance with the present invention there is provided a single manipulating key arranged to actuate mechanism constructed to move the tabulator bar into operative position, then release the typewriter carriage to the action of the spring 8 for continued movement until arrested by the appropriate pin 106 set in the tabulator bar, and then to so adjust the carriage propelling mechanism that upon the normal manipulation of the keyboard the carriage will travel in the opposite or reverse direction to its normal direction of travel. Such a key may be located at any convenient part of the keyboard, or, in fact, at any convenient part of the typewriter machine, but in the particular showing of the drawings a combined tabulating and reversing key 114 is located at the left hand end of the keyboard as viewed by the operator. The key 114 is at one end of a double or compound lever composed of two simple levers 115 and 116, each of the first order, and connected together at their meeting ends by a pivot pin 117 working in a longitudinal slot 118 in one of the levers, say, the lever 115, and said lever is carried by a bracket 119 fast to the main frame of the typewriting machine, or may be otherwise supported by a pivot pin 120, which in the particular showing of Fig. 4 is indicated as working in a slot 121 in the member 115. The lever 116 is mounted on a pivot pin 122, either secured directly on a fixed portion of the machine, or upon a bracket 123 made fast to a fixed portion of the machine. Springs 124$^a$ and 124$^b$ each fast at one end to a fixed part of the machine and at the other to the connected ends of the compound lever tend constantly to maintain the key 114 in the elevated position, but yield to pressure applied to the key 114 for its depression. At the end of the lever section 116 remote from its connection to the lever section 115, a link 124 is connected at one end to said end of the lever section 116, and this link 124 extends upwardly through the rear portion of the frame of the machine and is in turn threaded through a swivel nut 125 carried by one arm 126 of a broken lever, said lever having another arm 127 mounted on and projecting from the same pivot pin or screw 128 carrying the arm 126, and in the particular showing of the drawings this pivot pin is mounted on a bracket 129 erected on the top of the frame of the machine. The arm 126 is provided with a stop 130 extended into the path of the arm 127, and a spring 131 made fast at one end to the arm 126 and at the end to the arm 127 tends constantly to maintain the arm 127 against the stop 130, so that the two arms 126 and 127 act as a lever of the first order when opposed by any forces insufficient to extend the spring 131.
Mounted on the bracket 129 by means of a pivot pin or screw 132 is a rock member 133 having at one end a laterally offset nose 134 in overriding relation to the lever arm 127, and on the side of the pivot pin 132 remote from the nose 134 provided with an extension 135 having at the end an adjustable stop member in the form of a screw 136. The rock arm 133 with its nose 134 is designed to operate as an adjustable stop limiting the swinging of the lever arm 127 in one direction, and this lever arm is so located with reference to the angle arm or support 93 as to underride this arm to the rear of the pivot 95 thereof, and the free end of the lever arm 127 engages a shoulder 137 on the support 93 in such manner that when the lever arm 127 is rocked in one direction, that is, toward the stop nose 134, the tabulator bar is in turn rocked toward the active position, so as to bring the pin or pins 106 in the path of the stop 107 movable with the carriage. In the drawings the shoulder 137 is shown as made separately from and attached to the supporting rock arm 93, but it will be understood that it may be an integral part of the arm or support 93.

The end of the lever arm 126 remote from the pivot support 128 is downturned, as indicated at 138, and attached to the lever arm 126 between its downturned outer end and the pivot 128 is a leg 139 in laterally offstanding relation to, and in the main parallel with that portion of the lever arm 126 having the termination 138. The leg 139 is provided with a downturned toe or tapered extremity 140. The arm 126 moves alongside of and in close relation to one edge of an upstanding post 141 having an elongated slot 142 through which the leg 139 extends and along which it is movable.

Projecting rearwardly from the plate 19 near the upper portion thereof and at the end of the plate remote from the lever arms 126 and 127, is a pivot stud 143 which may be in the form of a screw, and mounted at one end on this stud is an elongated rock arm 144 extending across the rear face of the plate 19 below the stud 25 and between the escapement dogs 23 and 24 and the corresponding face of the plate 19. That end of the arm 144 remote from the stud 143 has connected thereto by means of a pivot 145 another rock arm 146, while the corresponding end of the rock arm 144 is formed with an extended stop member 147 in the path of the arm 146. The arm 146 is normally constrained to remain in contact with stop 147 by a spring 148 connected at one end to a laterally extended portion of the arm 144, and at the other end to the arm 146, but this spring will yield to permit independent movement of the arm 146 on the pivot 145 in a direction away from the stop 147. In the particular construction shown in the drawings the plate 19 is located nearer the rear end of the typewriting machine than the arms 126 and 127, and the arm 146 is angularly offset, as shown at 149, so that its free extremity 150, that is, the end remote from the pivot pin 145, is substantially in alinement with the leg 139. The extremity 150 carries an upstanding block 151 leaning away from the extremity 150 at an angle thereto, and pivoted in this block so as to hang pendently therefrom is a dog 152 having a terminal tooth extension 153 normally in the path of the taper extremity or toe 140 of the leg 139. The dog 152 is normally urged toward the leg 139 by a spring 154 housed in the block 151, and the spring permits yielding of the dog 152 for a sufficient distance to permit the toe 140 and nose 153 to pass each other. To take any lateral strain from the pivots 143 and 145, the end 150 of the arm 146 is guided by an upstanding bracket 155 erected on the top of the frame of the typewriter machine, and provided with an elongated guiding recess 156 permitting rocking movements of the arm 146 in a substantially vertical plane about the pivot 145 which is horizontal, or about the pivot 143 which is also horizontal in the ordinary working position of the typewriting machine. The arms 144 and 146 are in effect a single arm having its continuity broken by an elastically yielding connection composed of the pivot 145 and the spring 148, the purpose of this being to permit a combined movement of the two arms for a certain distance and a further movement of the arm 146 after movement of the arm 144 in the same direction is arrested.

Pivotally mounted on the front face of the plate 19 and at the same end of the plate as the arm 144, is another rock arm 157 pivotally connected about midway of its length to the slide 66 by a pin 158 entering a slightly elongated slot 159 in the slide, so as to compensate for the arc of movement of the pin 158 about the pivot of the arm 157 since the slide 66 has a straight path of travel in its guides. The pivotal connection of the arm 157 to the plate 19 may be formed by a screw 157ª, but any other means for the purpose may be employed.

Pivotally mounted on the plate 19 on the same face as the arm 157, but at the other end of the plate, is a bent lever 160 having one end 161 extending through an elongated recess 162 in the guide 155, the arm 161 being parallel with the arm termination 150 and having its free end in the path of the terminal portion 138 of the lever arm 126. The lever 160 is connected to the plate 19 by a pivot stud 163, and has a short arm 164 in the path of that end of the arm 157 remote from its pivot support, said end being downturned as shown at 165 to engage the end 164 of the lever 160.

Pivotally mounted on the plate 19 on the same face as the arm 144 is a lever 166 the pivotal mounting of the lever being shown as in the form of a screw stud 167, but may be of any other construction. The lever 166 has a shorter arm 168 so related to the rock arm 144 as to lie in the space between the arm 144 and the plate 19, and at the free end of the arm 168 it carries a pin 169 projecting through the arm 144 and into the matching recesses 26 of the dogs 23 and 24. The pin 169 may be round and the recesses in the dogs 23 and 24 may each be of semi-cardioid shape, so that the pin on moving into the more contracted end of the combined recesses tends to spread the dogs apart.

The lever 166 has its longer arm extending away from the plate 19 toward the opposite side of the typewriting machine from the lever arms 126 and 127, and this long arm 166 of the lever is first bent, as shown at 170, toward the top of the frame of the machine, and then for a distance substantially parallel therewith, and finally at substantially right angles toward the front of the machine, the last-named end of the lever being shown at 171. A spring 172 connected at one end to the frame of the machine and at the other end to the long arm of the lever 166 near the pivot 167 tends to maintain the lever 166 with the pin 169 raised out of the path of the dogs 23 and 24, and with the long arm of the lever depressed. The end 171 of the lever 166 is in the assembled machine in the path of the free end of the elongated finger 105, so that when the tabulator bar is rocked from the inactive toward the active position, which movement raises the finger 105, the lever 166 is rocked on its pivot against the action of the spring 172 in a direction to cause a spreading of the dogs 23 and 24 out of engagement with the ratchet wheel 22, thus releasing the escapement arbor 11 and permitting the spring 8 to turn the drum or wheel 9 in a direction to wind the band 14 thereon, and thereby actuate the escapement arbor in a direction to impart movement to the typewriter carriage by means of the gear wheel 22 and rack 53 in the ordinary or normal direction until this movement is arrested by the engagement of the stop 107 with a pin 106 in its path. Since the rock arm support 94 of the tabulator bar is directly under the control of the ordinary tabulating key 104, a manipulation of such key 104 releases the carriage for movement to the desired tabulating positions in the customary manner. The same tabulating operations may be performed by the key 114 in a manner which will hereinafter be described, but for reasons which will also hereinafter appear, it is desirable at times, to provide for the tabulating movements of the carriage without bringing about certain other conditions resulting from the operation of the key 114, and, therefore, the lever 166 is provided connecting up the structure of the present invention with the customary tabulating key 104. Otherwise the lever 166 might be omitted, for then the arm 144 in its movements will cause the same spreading or release of the dogs 23 and 24 as is accomplished by the lever 166. The lever 166, however, is useful in connection with the present invention even were the tabulating key 104 omitted.

Mounted on the upper end of the post 141 by means of a pivot screw 172ª is a short rock arm 173 fast at the end remote from the pivot on one end of a rod 174, this rod extending across the back portion of the machine in front of and at a short distance from the plate 19. The other end of this rod is fast to one end of an angle lever 175 pivotally supported by a pivot screw or pin 176 to the upper end of an upright post 177 rising from the top of the frame of the machine, and made fast thereto. The lever 175 has its short arm connected to the rod 174, this short arm being of the same length as the rock arm 173, while the long arm of the lever is formed with a return bend 178 entering between the legs of a V-shaped rocker 179 mounted on the post 177 by means of a pivot screw or stud 180. One arm 181 of this rocker 179, and constituting the shorter arm, engages over the return end 178 of the lever 175, the parts being rounded to reduce friction. The rocker 179 has the longer arm 182 terminating in a laterally extended finger 183 underriding the angle extension 171 of the lever 166. The rod 174 is overridden by one end of a lever 184 made fast to an appropriate part of the carriage 2 by a clip 185, while the other end of the lever is in the path of a rock member 186 customarily present in typewriting machines of the kind illustrated in the drawings and under the control of escapement release finger piece 187. When such release finger piece 187 is depressed in the customary manner, the rock member 186 is raised, thus depressing that end of the lever 184 bearing upon the rod 174, and the latter is forced to rock downwardly about its pivot supports 172 and 176. This movement imparts a lifting action to the return bend 178 of the lever 175, which engaging upon the arm 181 of the rocker 179 imparts a like lifting movement to the finger 183, which in turn causes a lifting of the end 171 of the lever 166, expanding the spring 172 and depressing the pin 159, the latter spreading the escapement dogs, and thus releasing the escapement ratchet, thereby permitting movements of the carriage in either direction at will by the hand of the operator, as is customary. In removing pressure from the release finger piece 187 the spring 172 returns the parts to their normal position with the escapement again engaged by the dogs 23 and 24.

Mounted upon that end of the frame adjacent to the lever arm 127 is a bracket 188 having an upstanding post 189 provided with a laterally offstanding flange 190 in line with the longitudinally movable part of the tabulator bar, this flange acting in the capacity of a guard. Pivotally mounted on the bracket 188 by a pivot support, which may be in the form of a screw 191, is a lever 192, this lever being substantially upright in operative position with its upper end 193 in the path of the bracket 113 carried by the movable member 79 of the tabulator bar when the said tabulator bar is in the active or forward position with a pin 106 in the path of the stop 107.

The other end of the lever 192, which end may be carried below the top of the frame of the machine, is connected by a link 194 to an upright rock member 195 pivotally carried by a bracket 196 in the particular showing of the drawings, but it will be understood that this rock member 195 can be mounted directly on the frame of the machine. The lever 192 has its upper end held normally in contact with a stop pin 197 carried by the bracket 188, by means of a spring 198 having one end fast to the link 194 and the other end secured to a fixed portion of the frame of the machine. Under these conditions the rock member 195 is substantially upright, and it has an upper end 199 in the path of a stud or pin 200 carried by the lever arm 126. When the parts are in the position to which they are normally constrained by the spring 198, the upper end 199 of the rock member 195 is engaged by the stop pin 200 after the lever arm 126 has moved for a certain distance toward the rock member 195, which latter thereby becomes a stop member for the lever arm 126. It is only by rocking the stop member 195 on its pivoted support against the action of the spring 198, that the upper end 199 may be moved out of the path of the stop pin 200, and further movement of the lever arm 126 in the same direction as before is permitted.

When the typewriter carriage is released for the tabulating movement, the stop 107 engages a pin 106 and the tabulator bar member 79 has imparted thereto a lengthwise movement against the action of the spring 86 for a distance permitted by the length of the slots 84, but this movement is sufficient to bring the bracket 113 into engagement with the end 193 of the lever 192 and rock said lever in a direction extending the spring 198, and at the same time moving the end 199 of the rockable stop member 195 out of the path of the stop pin 200 on the lever arm 126.

Mounted on the front portion of the frame of the machine to the rear of the keyboard, and upon a plate 201 in the particular showing of the drawings, is an elongated slide 202 guided by retaining members 203 shown in the drawings as broad head screws. These screws have their shanks extended through elongated slots 204 in the slide 202 permitting the latter to move for a limited distance, this movement being effected in one direction by a spring 205 fast at one end to the plate 201 by a screw 206 and at the other end to a stud 207 carried by the slide extended through an elongated slot 208 in the plate 201. That end of the slide 202 adjacent to the key 114 is connected to one end of a rock arm 209 mounted on a rock arbor 210 suitably journaled within the keyboard portion of the main frame. The arbor 210 carries a latch arm 211 formed at the end remote from the arbor with a nose 212 adapted to engage over the lever 115 when the latter is sufficiently depressed for the purpose. The movement of the latch arm 211 into latching engagement with the key lever 115 is brought about by the spring 205 as soon as the key 114 has been sufficiently depressed.

Mounted in the end of the plate 201 remote from the rock arm 209 is one end of a shaft 213 extending to the rear of the frame where it is supported in a bearing 214 erected on the rear extension 11 of the main frame. Fast to the front end of the shaft 213 in front of the plate 201 through which it extends, is a hub 215 from which extends a crank arm 216 having at the free end a crank handle 217. Also extending from the hub 215 is a shorter arm 218 of a length to move into engagement with the corresponding end of the slide 202, this end 219 being rounded to receive the arm 218.

Made fast to an appropriate part of the main frame, as, for instance, one of the legs thereof, is a stop plate 220 secured to the frame by a screw 221, and in this plate there is formed a curved slot 222 described about the screw 221 as a center, while at one side of the plate is an outstanding ear 223 in the path of a stop pin 224 carried by the crank arm 216 near the handle 217. The stop ear 223 determines the movement of the crank arm 216 in one direction, while the limit of movement of the slide 202 in a direction opposed to the spring 205 may determine the limit of movement of the crank arm in the other direction, or this crank arm may be stopped at such limit by any suitable means.

Between the bearing bracket 214 and an adjacent fixed portion of the frame 1 traversed by the shaft 213, said shaft is surrounded by a spring 225 having one end made fast to a fixed part of the frame of the machine, and the other end to a set collar 226 made fast to the shaft 213, so that on turning the shaft by means of the crank arm 216, the spring 225 is put under superior tension, and when the crank arm 216 is released the spring returns the shaft to its first position with the stop pin 224 in engagement with the ear 223.

The shaft 215 extends through and to the rear of the bearing 214 and at such point has fast thereto a hub 227 from which there extends a radial arm 228, and this arm has pivotally connected thereto as by a screw 229 a link 230 provided at the end remote from the arm 228 with an elongated slot 231. The slotted end of the link may be curved and the slot have a like curve, and extending through this slot is a headed pin or screw 232 fast in the outer end of the arm 36.

In the position of the parts shown in Fig. 2 the arm 36 is at the limit of its movement in one direction, being there held by the engagement of the finger 47 in the notch or recess 41, and the slot 231 is long enough to permit movement of the arm 36 toward the right, as viewed in Fig. 2, for an appropriate distance, for a purpose which will hereinafter appear.

With a machine constructed as described a depression of the key 114 causes the carriage to be released for quick movement to the column position desired, and this movement is not to the beginning edge of the column, but to the opposite or final edge thereof, and the feeding mechanism for the carriage is so adjusted that upon a manipulation of the keys of the typewriter, the writing is performed in a direction the reverse of or contrary to the normal writing direction of movement. For instance, in typewriting a column of figures representing sums of money, or any other figures, the carriage may be brought to either the decimal or the cents position, as may be needed, and then the sums of money are typewritten, beginning with cents and then proceeding to dollars, tens, hundreds, thousands, etc., in the order named. This insures the proper arrangement in the column of various sums of money with the same denominations of each sum immediately under those of the preceding ones, and this without effort or calculation on the part of the operator, and without the necessity of ascertaining the spacing of each sum of money to determine at what point it is necessary to begin writing the amount. With the ordinary typewriter it is necessary in order to have various sums of money in column form all end at the same point to calculate the beginning point of writing each sum. With the present invention the tabulating devices automatically establish the point of beginning the writing of each sum of money, and then automatically reverse the carriage feed, so that the operator has but to write down the sum of money, beginning with the lowest amount of the sum, and writing toward the higher amounts, but using the typewriter otherwise in the ordinary way.

Suppose, now, that it is desired to write a column of figures where the numerals are all to be properly placed with respect one to the other from the top of the column to the bottom, a pin 106 is placed in the tabulating bar at the position it is predetermined shall represent the right hand side of the typewritten column, and which for convenience of description may be considered as the decimal point. Of course, when sums of money are being written, it is customary to set the pin two spaces farther on to include cents, but this is to be understood in the idea of beginning the writing of the column at the decimal point. The first thing for the operator to do when ready to begin writing the desired numbers is to depress the key 114. This moves the compound lever 115, 116 against the action of the spring 124, and this movement through the rod or link 124 causes a depression of the free end of the lever arm 126. In Fig. 7 the lever arm 126 is shown in the normal position of rest with the end 140 a short distance from the tooth 153 of the dog 152, so that the arm 126 may have a short extent of movement before engaging the tooth 153. This movement is imparted to the lever arm 127, and the end of this arm engaging the shoulder 137 causes a rocking movement of the angle support 93 of the tabulator bar, so that this tabulator bar is moved forwardly until the pin 106 corresponding to the decimal position is in the path of the stop 107. Then the end 140 of the lever arm 126 by engagement with the tooth 153 causes a rocking movement of the arms 146 and 144, at the time connected to move as one arm, by the spring 147 the same as the arms 126 and 127 move together because joined by the spring 131. As soon as the tabulator bar reaches its forward position, which may be determined by the engagement of the corresponding end of the tabulator bar with the upstanding part 189 of the bracket 188, further movement of the arm 127 under the action of the arm 126 ceases, and the lever composed of the arms 126 and 127 breaks at the pivot point, the spring 131 being correspondingly extended. As soon as the movement of the arm 126 is sufficient to rock the combined arms 146 and 144 enough to bring the pin 169 into engagement with the dogs 23 and 24 in a manner to spread these dogs out of the path of the ratchet wheel 22, further movement of the arm 126 is arrested by engagement of the stop pin 200 with the end 191 of the rockable stop 195 then in the path of the pin 200. This position of the parts is shown in Fig. 8. The carriage being released, now travels under the action of the spring 8 until the stop 107 engages the pin 106 in its path, and the momentum of the carriage is imparted to the member 79 of the tabulator bar causing the latter to move lengthwise. This brings the bracket 112 into engagement with the end 193 of the lever 192 rocking the latter on its pivot 194 to move the link 194 in a direction to expand the spring 198 and at the same time rock the stop 195 out of the path of the pin 200. The pressure of the finger of the operator being still exerted upon the key 114 the arm 126 now relieved from the arresting effect of the rockable stop 195 continues to move in the same direction as at first, causing the rock arm composed of the two arms 144 and 146 to break at the pivot 145, since the engagement of the pin 169 with the dogs has caused the latter to reach the limit of their separating movement, thus stopping the arm 144. The end 138 of the lever arm 126 engages the end 161 of the lever 160, thus rocking this lever in a manner to raise the short end 164, in turn raising the end 165 of the arm 157. This last movement causes a corresponding lifting of the slide 66, which latter embracing the intermediate bar 71 of the frame 59 by the rollers 69 and 70 causes a rocking of this frame on the pivot pins 65, thus in turn lifting the rack 53 by way of the frame 55, 56 carrying the rack. Under normal conditions of writing the rack 53 is in engagement with the pinion 30 as before explained, and so long as such engagement continues the carriage is fed in the normal or customary direction of typewriting. The lifting of the rack 53 causes it to engage the roller 78 and thereby rock the arms 74 on the pivot 76, and the gear wheel 75 is correspondingly lifted, but more rapidly than the rack, so that before the rack has been raised out of mesh with the gear wheel 30 the gear wheel 75 has already moved into mesh with the rack 53, and being constantly in mesh with the gear wheel 30, the rack is temporarily locked against movement in either direction, and this locking continues until the rack is moved wholly out of mesh with the gear wheel 30. For the best results and to insure proper meshing of the gear wheel 75 with the rack 53 during the movements described, the frame carrying the rack is given a lengthwise shift of a few hundredths of an inch, but no attempt has been made to show this in the drawing on account of its relative minuteness. This is only necessary because of the curved path of movement of the gear 75 about the gear 30, and is unnecessary in some other arrangements which shall be hereinafter described.

While the continued downward movement of the outer end of the lever arm 126 has been progressing, the divergent curved paths of the end 140 of the arm 126 and the tooth 153 of the dog 152 about the pivot of the dog and about the pivot 145 causes a disengagement of the end 140 from the dog 152, and the arm 146 under the action of the spring 147 returns to its normal relation to the arm 144, while the spring 129 returns the dogs into proper relation to the ratchet wheel 22, the spring 172 aiding in lifting the arm 144 and holding it so lifted. The escapement is therefore in operative position to respond in the usual manner to the manipulation of the typewriter keys, wherefore the spring 8 acts upon the escapement arbor in the usual manner to rotate it step by step, but this rotation although in the normal or forward manner, is transmitted in the reverse direction to the rack and by the latter to the typewriter carriage because of the introduction of an additional pinion operating as a direction-reversing pinion.

While the stop member 195 normally in the path of the stop pin 200 serves to momentarily arrest the progressive operative movement of the lever arm 126 until the carriage has accomplished its full tabulating movement, that is, the stop 107 has reached a pin 106 and has caused the limited longitudinal movement of the tabulating bar member 79 to its full extent, thus moving the stop member 195 out of the path of the pin 200, the momentary arrest of the movement of the key 114 is not obtrusively marked in practice, for the carriage movement is rapid and the release of the key to complete its full downward movement occurs so quickly that the slight pause in its movement is not noticeable. Still, however, this slight pause is of importance, since it enables the carriage to fully complete the designed movement before the reversal of the feeding mechanism takes place and the key 114 is locked in its full operative position. When the key 114 has been depressed to the full extent to bring about the reversal of feed of the carriage, the latch arm 211 snaps over the key lever 115, being impelled to such movement by the spring 205 acting on the slide 202.

When it is desired to return the parts to the normal position, the operator by grasping the handle 217 rocks the shaft 213 in a direction to further wind the spring 225, this being in a clockwise direction as viewed in Fig. 6. Such movement brings the arm 218 into contact with the end 219 of the slide 202, and the latter is moved lengthwise in opposition to the spring 205, such movement being to the left as viewed in Fig. 6. This causes a swinging of the arm 209 toward the left and the motion is imparted through the arbor 210 to the latch member 212, thus carrying its nose 212 from engagement over the lever 115, and the latter is released to the action of the spring 124 and the weight of the parts then carried by the lever arms 126 and 127, so that the key 114 is raised to its full extent. Such movement of the key is participated in by the lever arm 126, thereby releasing the lever 160 and permitting the slide 66 to drop, the rack 53 with the frame carrying it and also the frame 59 following. The arms 74 follow the rack 53 in its downward movement, and the pinion 75 is moved away from contact with the rack 53 and the latter is again brought into engagement with the pinion 30. The rising movement of the arm 126 brings its end 140 into engagement with the nose 153 of the dog 152, but the latter being spring mounted readily yields to the passage of the end 140 and when the latter has risen sufficiently the dog 152 snaps back into its path. The rising movement of the arm 126 permits a lowering movement of the arm 127, and as this arm is supporting the tabulator bar on the same side of the pivots of the supporting arms 93 and 94 as the tabulator bar, the latter rocks about its pivots following the lowering movement of the lever arm 127, and moves backwardly away from the operative position carrying the engaged pin 106 out of the path of the stop 107. As soon as this occurs the spring 86 causes the longitudinal movement of the member 79 of the tabulator bar in a direction to withdraw the bracket 113 from engagement with the end 193 of the lever 192, and the spring 98 returns the lever 192 to its initial position bringing the stop member 195 again into the path of the stop pin 200. The pin 106 which was engaged by the stop 107 has been carried by the return movement of the bar member 79 to a position which if the tabulator bar be again rocked forwardly into operative position will be out of the path of the stop 107 if the latter be considered as remaining at the point where its movement was arrested by the pin 106. This construction permits the ordinary tabulating movements of the typewriter carriage by means of the key 104, or, if desired, by the key 114, but where ordinary tabulating movements of the carriage are desired, it is usually more convenient to utilize the key 104, since otherwise it would be necessary to restore the parts after each release of the carriage if the key 114 were used for tabulating movements other than the one for which it is especially provided.

The restoring operation of the rock shaft 213 performs another and particularly important function in addition to causing the release of the key 114 for its return to normal position and the return of the parts controlled by such key to normal position.

When the rack bar is raised to cause the setting of the escapement mechanism with relation to the rack bar to reverse the movement of the carriage, the long side 56 of the rack bar frame participates in the rising movement, wherefore the spring 52 then causes a rocking movement of the rock member 48 sufficient to lift the finger 47 out of the notch 41 in which it normally rests. The rising movement of the finger 41 releases the pawl 44 to the action of the spring controlling it so that the tooth 45 is brought into engagement with the gear wheel 34 between two teeth thereof. This gear wheel is moved by the rotative movements of the escapement arbor, but in the normal or forward movements of the typewriter carriage the gear wheel 34 is simply an idler performing no work. Now, however, it is coupled up by the pawl 44 with the arm 36, and the finger 47 being at the time out of the recess or notch 41, the arm 36 is free to move with the gear wheel 34, the movement of such gear wheel being counterclockwise, as viewed in Fig. 2. The result is that the pin or screw 232 normally at that end of the slot 231 toward the pivoted end of the link 230 is moved toward the outer end of the slot for a distance corresponding to the extent of rotative movement of the gear wheel 34. The full permissible extent of such movement may be as great or as small as may be desired, being controlled by the relative sizes of the gear wheel 34 and pinion 33 and the length of the arm 36, while the slot 231 is made of proportionate length. In the particular showing of the drawings the swing of the arm 36 and the length of the slot 231 are agreeable to a reverse movement of the carriage of about fifteen spaces which is usually ample for the particular work for which the mechanism is designed, but it will be understood that the invention is by no means limited in this respect to any particular proportioning of the parts.

The outer free end of the link 230 is so related to the arm 36 that the full rocking movement of the crank arm 216 to cause the unlatching of the lever carrying the key 114, will by engagement of the outer closing wall of the slot 231 with the screw or stud 232 move the arm 36 to a position where the finger 47 may drop into the recess 41, thereby engaging the pawl 44 and moving its tooth 45 away from engagement with the gear wheel 34 and, moreover, serving as a lock for the arm 36 preventing any rocking movements thereof, so long as the finger 47 is lodged in the notch 41. This return of the arm 36 from the position to which it is actuated by the active movement of the gear wheel 34 to the normal or locked position results in a backward turning of the escapement arbor, winding up the strap 14 on the pulley 13, and a winding up of the spring 8 to an amount agreeable to the unwinding of the spring 8 in causing the reverse movement of the carriage to the extent brought about in writing the matter in the particular column for which the reverse movement is designed. The arm 36 together with the gear wheel 34 and the link 230 with its controlling rock bar 228 fast to the shaft 231 constitute a restoring or compensating mechanism for the power spring, so that despite the fact the carriage has had a reverse movement imparted to it, the tension of the spring is maintained at all times the same as though the carriage had been moved only in the normal or forward direction.

When in the usual operation of a typewriter the end of a line is reached, whether this be a full line or but a partial line, the carriage is returned to the beginning of the line or to any other point by the hand of the operator, thus winding up the power or carriage impelling spring to the same extent that it was unwound in moving the carriage along the partial or full line, as the case may be. Suppose, however, that with the present invention the carriage be moved along either in the ordinary process of typewriting, or in tabulating, to the position from which it is desired to reverse the movement of the carriage, and then this reverse feed of the carriage be effected to the desired extent. If then the carriage be returned to the initial position to write another line, or if further forward writing in the same line be desired, it will be seen that the tension of the spring would be reduced by an amount equivalent to the reverse movement of the carriage unless the used up force be restored or compensated. This is accomplished by the restoring or compensating mechanism represented by the arm 36 and means for returning it to its initial position, and at the same time winding up the power spring 8 to an extent corresponding to the reverse movement of a carriage. Under such circumstances the power spring is always under the same tension in forward writing as it has in the ordinary typewriting machine where there is no provision for reverse movements of the carriage during the actuation of the ordinary keys and type levers.

In the foregoing description a single rack bar and a reversing pinion are employed in connection with the main driving pinion mounted on the escapement arbor, in order that the carriage may be driven forwardly or in the reverse direction, as desired, by a one way rotation of the escapement arbor, and a one way movement of the power means. Various means of accomplishing the same result are available, and a few of a variety of such different means are illustrated in the drawings.

In Fig. 18 there is provided an open-sided frame 233 considerably longer than wide, and having across the open side a rack bar 235 connected at the ends to the end bars 234. This frame corresponds to the frame 55, 56 and the rack bar 53 of the preceding figures, except that in Fig. 18 the rack bar 235 is arranged in underriding relation to the pinion 30. In spaced relation to the rack bar 235, the frame 233 carries another rack bar 236 with its teeth facing those of the rack bar 235 and spaced therefrom by a distance greater than the diameter of the pinion 30, so that the frame 233 may be lowered to bring the teeth of the rack bar 236 in engagement with the pinion 30, in which case the teeth of the rack bar 235 are free from engagement with the pinion 30. On the lifting of the frame 233 the pinion 30 is engaged by the rack bar 235, while the rack bar 236 is out of mesh with the pinion 30. The closed side of the frame 233 has lugs 57$^a$ formed thereon, and as the remainder of the structure shown in Fig. 18 is the same as that shown in the preceding figures of the drawing, the same reference numerals are employed on Fig. 18 to designate the parts agreeable to the structure shown in the preceding figures. The lower edge of the rack bar 235 performs the same office as the bar 56 of the preceding figures in engaging the roller 51 of the rock member 48.

While in the structure shown in Figs. 1 to 17 the rack bar 53 engages either directly with the pinion 30 or with the reversing pinion 75 and so is active with respect to the carriage in either of its directions of travel, but one rack bar is active at a time in the structure of Fig. 18. The rack bar 236 in Fig. 18 when in engagement with the pinion 30 causes the forward or normal movement of the carriage, and the reverse movement is due to the engagement of the rack bar 235 with the pinion 30. The structure of Fig. 18 is efficient, but that of the preceding figures is in general preferable thereto.

In Figs. 19 and 20 the same result as is accomplished in the structures of the preceding figures is brought about by the employment of a rack bar 237 with teeth 230 along one long edge, and other teeth 239 along the opposite long edge. A frame 59 is provided as before under the control of a slide 66$^a$, which latter is mounted on a plate 19$^a$. The slide 66$^a$ is controlled as in the preceding figures by mechanism such as is described with reference thereto, but in Fig. 20 this mechanism is shown conventionally as comprising a link 24 and a lever 241, whereby up and down movements of the slide 66ª are brought about. The frame 59 carries a suitable frame 242 having members 243 supporting the rack bar 237.

Mounted on the escapement arbor 11 in addition to a gear wheel 30ª corresponding to the gear wheel 30 of the preceding figures, is another gear wheel 244 between the gear wheel 30ª and the plate 19ª. Meshing with the gear wheel 244 and carried by a stud 245 on the plate 19ª is an idler gear wheel 246 serving as a transmission gear, and this idler gear 246 is in mesh with another gear wheel 247 carried by a stud 248 projecting from the plate 19ª on the same side as the gear wheel 246. The gear wheel 247 has either in one piece with it, or joined to it another gear 249 arranged adjacent to the opposite edge of the rack 227 from the gear wheel 30ª. Motion from the shaft 11 is transmitted simultaneously to the gear wheels 30ª and 244 and from the gear wheel 244 through the idler gear 246 to the gear wheels 247 and 249, but the direction of rotation of the gear wheel 249 is opposite to that of the gear wheel 30ª. If the rack 237 be in engagement with the gear wheel 30ª, then the carriage is propelled in the ordinary or forward direction. When, however, the rack 237 is lifted out of mesh with the gear wheel 30ª into mesh with the gear wheel 249, the rack 237 is propelled in a direction the reverse of the ordinary or normal direction.

In Figs. 21 and 22 still another arrangement of reversing gear is illustrated. The frame 59 carries by means of a pendent support 250 a rack bar 251 having teeth 252 along one edge only, this being the lower edge in the particular arrangement shown. Mounted on the escapement shaft 11 is a gear wheel 253 in constant mesh with the teeth 252 of the rack bar 251, but this gear wheel is free to rotate on the shaft and is prevented from moving longitudinally on the shaft by appropriate side flanges 253ª. The gear wheel 253 is provided with a hub having oppositely directed clutch teeth 254 and 255, respectively, on opposite sides of the gear wheel. Mounted upon a support 256 for sliding movement thereon is a carrier 257 having spaced standards 258 constituting spaced journal supports for the shaft 11. Mounted on the shaft 11 adjacent to and inside of the respective standards 258 are beveled gears 259 and 260, respectively, connected by an idler bevel gear 251 meshing with them. The bevel gear 259 has a hub portion with clutch teeth 262 matching the teeth 254 of the gear wheel 253 and the bevel gear 260 has clutch teeth 263 matching the clutch teeth 255 of the gear wheel 253. The carrier 257 may be moved on its support 256 by mechanism similar to the mechanism employed for shifting the rack 53 of Figs. 1 and 17 and is assumed to be connected up in like manner to a key like the key 114, whereby the tabulating movements of the carriage and the reverse shifting of the driving gear may be brought about. In Fig. 21 such mechanism is indicated in a conventional manner by a link 264, a bell crank lever 265, and a key lever 266 terminating in a key 267, the showing being merely a meager disclosure of an operating mechanism for the carrier 257. In the structure of Figs. 21 and 22 there is no need of up and down movements of the rack 251, hence the slide 66 is replaced by the carrier or slide 257, but the parts 264 and 267 are to be understood as indicative of parts similar to those of the structure of Figs. 1 to 17, whereby the various movements needed to bring about the operation of the machine are performed. Since the structure of Figs. 21 and 22 has to do only with the reversing mechanism, the other connections are omitted, or merely broadly indicated by the parts 264 to 267.

The arbor 11 is assumed to always rotate in one direction, and one of the bevel gear wheels 259 or 260 is secured to the arbor so as to rotate therewith, and if the arbor has no lengthwise movement, then these gear wheels are mounted on the arbor to slide along the arbor. Such arrangement may include a longitudinal groove 268 in the arbor, and a set screw or pin 269 on one of the bevel gear wheels. If one gear wheel is secured to the arbor for rotation therewith the other gear wheel will of necessity rotate on the arbor in the other direction because of the intermediate idler gear wheel 261. If, now, the carrier 257 be moved in its support 256 in one direction to bring the teeth 262 into engagement with the teeth 264, then the pinion 253 is rotated so that the rack 251 is caused to travel in one direction which may be the normal direction of travel. When the carrier 257 is moved in the opposite direction the teeth 263 are brought into mesh with the teeth 255, the other clutch teeth separating, and as the bevel gear 260 rotates oppositely from the direction of rotation of the bevel gear 259, the pinion 253 is driven in the opposite direction and the rack 251 is reversed in movement, thus reversing the direction of travel of the typewriter carriage.

From the foregoing description with respect to the reversing mechanism whereby motion is transmitted from the main spring 8 to the carriage, it will be seen that many different devices may be employed for the purpose, and that, therefore, in this respect the invention is by no means confined to any particular arrangement for the purpose.

Since different makes of typewriters vary quite widely in their structures, the adaptation of the present invention to such different makes of typewriters will necessitate considerable change in the structure herein disclosed when incorporated in the different makes of typewriters. For this reason the invention is susceptible of considerable modification in its practical embodiment, but this may be brought about without any material departure from the salient features of the invention. Again, various modifications of structural details become necessary in adapting the invention as an attachment to existing typewriters or where the invention is built into the typewriter during the progress of manufacture. It will, therefore, be understood that for these and other reasons the showing of the drawings is to be taken as an example of a practical embodiment of the invention, rather than as limiting the invention to any strict conformity with the showing of the drawings.

Material features of the present invention are comprised in means whereby the manipulation of a single key or other similar device causes the movement of the typewriter carriage to a predetermined position from which the ordinary manipulation of the typewriter causes the carriage to feed reversely so far as necessary, and after the completion of the reverse movement, and if desired coincident with the resetting of the feeding mechanism, the energy consumed in such reverse movement of the carriage is restored, so that when the carriage is returned in the customary manner to the beginning of the line the energy represented by the carriage propelling spring is always the same whether or not the reverse movement of the carriage has been utilized. In addition to this, the present invention contemplates the control of the single manipulating key or the like so that the operations caused by the actuation of the key must of necessity follow each other in orderly succession, and the operator is prevented from causing any overlapping of these operations.

What is claimed is:—

1. In combination with a traveling carriage, a feeding mechanism for feeding the carriage in opposite directions, a tabulator, and a single key and connections therefrom to the tabulator and the carriage feeding mechanism for setting both into operative positions.

2. In combination with a traveling carriage, a feeding mechanism, for feeding the carriage in opposite directions, a shiftable tabulating device, and a single key and means controlled thereby for shifting the tabulating device and throwing the feeding mechanism into operation so as to cause the the carriage to move in either direction.

3. In combination with a traveling carriage, a feeding mechanism for feeding the carriage in opposite directions, a tabulating device, and a single key for controlling the position of the tabulating device and shifting the feeding mechanism so as to cause the carriage to operate in the reverse direction to its normal direction of operation.

4. In combination with a traveling carriage, a feeding mechanism for feeding the carriage in opposite directions, a tabulating device, a key for controlling the tabulating device and the feeding mechanism to shift the tabulating device into the proper position and to move the feeding mechanism so as to cause the carriage to feed in the direction opposite to its normal operation, and locking mechanism for locking the key-actuated mechanism.

5. The combination with a traveling carriage, of a tabulator, a carriage-feed reversing mechanism, and a single operating means common to both.

6. The combination with a traveling carriage, of a tabulator, a carriage-feed reversing mechanism, a single manipulating key, and operating connections between said key and both the tabulator and the feed reversing mechanism.

7. The combination with a traveling carriage, of a tabulator, a carriage-feed reversing mechanism, and a single operating means common to both and timed in operation to move the tabulator into operative position prior to moving the carriage-feed mechanism to the reverse position.

8. The combination with a traveling carriage, of a tabulator, a carriage-feed reversing mechanism, a single operating means common to both, and means for causing the successive operation of the tabulator and the carriage-feed reversing mechanism by a progressive movement of the common operating means.

9. The combination with a traveling carriage, of a tabulator, a carriage-feed reversing mechanism, a single operating means common to both, and means for causing the successive operation of the tabulator and the carriage-feed reversing mechanism by a progressive movement of the common operating means, said last-named means including means for arresting the progressive movement of the common operating means until the carriage has reached a limit of movement determined by the tabulator.

10. The combination with a traveling carriage, of a tabulator, a carriage-feed reversing mechanism, a single operating means common to both, and stop mechanism responsive to the tabulator for preventing actuation of the carriage-feed reversing mechanism until the carriage has reached a limit of movement determined by the tabulator.

11. The combination with a traveling carriage, of a tabulator, a carriage-feed reversing mechanism, and an operating means therefor common to both and provided with connections thereto timed in operation to actuate the tabulator and the reversing mechanism in succession in the order named.

12. The combination with a traveling carriage, of a tabulator, a carriage-feed reversing mechanism, an operating means common to both and timed in operation to actuate the tabulator and reversing mechanism in succession in the order named, and a stop mechanism for the common operating means normally active to prevent actuation of the reversing mechanism to active position before the carriage has attained the position determined by the tabulator.

13. The combination with a traveling carriage, of a tabulator, a carriage-feed reversing mechanism, an operating means common to both and timed in operation to actuate the tabulator and reversing mechanism in succession in the order named, and a stop mechanism for the common operating means normally active to prevent actuation of the reversing mechanism to active position before the carriage has attained the position determined by the tabulator, said tabulator and stop mechanism having coacting means for then releasing the common operating means to permit the actuation of the carriage-feed reversing mechanism.

14. The combination with a traveling carriage, of forward and reverse feeding means therefor, means for arresting the forward travel of the carriage at any predetermined point, and means for causing the travel-arresting means to become active to stop the forward travel of the carriage and for immediately thereafter setting the feeding means for the reverse travel of the carriage.

15. The combination with a traveling carriage, of a propelling means therefor, forward and reverse gearing between the propelling means and the carriage, means movable into the path of the carriage to intercept it in its forward travel at any predetermined point, and means for rendering the intercepting means active to stop the forward travel of the carriage and for immediately thereafter setting the feeding means for the reverse travel of the carriage.

16. The combination with a traveling carriage, of means for reversing the direction of feed of the carriage, means for releasing the carriage for free movement in its normal direction of travel, means for arresting the free movement of the carriage in the normal direction of travel at any chosen point, and means common to the releasing, stopping and reversing mechanisms for causing their operation.

17. The combination with a traveling carriage, of means for reversing the direction of feed of the carriage, means for releasing the carriage for free movement in its normal direction of travel, means for arresting the free movement of the carriage in the normal direction of travel at any chosen point, means common to the releasing, stopping and reversing mechanisms for causing their operation, and a timing means for the common operating means for delaying the action of the latter upon the reversing means until the carriage has reached the limit of its free travel determined by the stop means therefor.

18. The combination with a traveling carriage, of means for reversing the direction of feed of the carriage, means for releasing the carriage for free movement in its normal direction of travel, means for arresting the free movement of the carriage in the normal direction of travel at any chosen point, means common to the releasing, stopping and reversing mechanisms for causing their operation, and a timing means for the common operating means for delaying the action of the latter upon the reversing means until the carriage has reached the limit of its free travel determined by the stop means therefor, said timing means having automatic means for its movement to release the common operating means for further active movement at the completion of the free travel of the carriage in the normal direction.

19. The combination with a carriage having propelling means for moving it through a determined range of travel, of means for releasing the carriage for free travel in a normal or forward direction, means for stopping the free forward travel of the carriage at any desired point, means for reversing the direction of travel of the carriage at any desired point in its range of forward travel, and operating means common to the carriage releasing and stopping means and to the direction reversing means for the actuation thereof in predetermined order.

20. The combination with a carriage having propelling means for moving it through a determined range of travel, of means for releasing the carriage for free travel in a normal or forward direction, means for stopping the free forward travel of the carriage at any desired point, means for reversing the direction of travel of the carriage at any desired point in its range of forward travel, operating means common to the carriage releasing and stopping means and to the direction reversing means for the actuation thereof in predetermined order, and automatic means in the path of that part of the common operating means controlling the direction reversing means for the carriage and responsive to the carriage stopping means for causing the operation of the carriage reversing means to active position subsequent to the operation of the carriage stopping means.

21. The combination with a carriage having propelling means for moving it through a determined range of travel, of means for releasing the carriage for free travel in a normal or forward direction, means for stopping the free forward travel of the carriage at any desired point, means for reversing the direction of travel of the carriage at any desired point in its range of forward travel, operating means common to the carriage releasing and stopping means and to the direction reversing means for the actuation thereof in predetermined order, automatic means in the path of that part of the common operating means controlling the direction reversing means for the carriage and responsive to the carriage stopping means for causing the operation of the carriage reversing means to active position subsequent to the operation of the carriage stopping means, and locking means for holding the parts controlled by the common operating means in their final active position.

22. The combination with a carriage, of propelling means for moving it throughout a determined range of travel, an escapement for normally holding the carriage against the action of its propelling means, means for releasing the carriage from the escapement for free travel in a normal or forward direction, a tabulator bar movable into operative relation to the carriage to stop its free forward travel at any predetermined point, normally inactive travel-reversing mechanism between the propelling means and the carriage, and a single manipulating means with connections therefrom to the tabulator bar, the escapement mechanism, and the reversing mechanism for moving the tabulator bar, opening and closing the escapement mechanism, and setting the reversing mechanism into operative relation to the carriage, all in the order named.

23. The combination with a carriage, of propelling means for moving it throughout a determined range of travel, an escapement for normally holding the carriage against the action of its propelling means, means for releasing the carriage from the escapement for free travel in a normal or forward direction, a tabulator bar movable into operative relation to the carriage to stop its free forward travel at any predetermined point, normally inactive travel-reversing mechanism between the propelling means and the carriage, a single manipulating means with connections therefrom to the tabulator bar, the escapement mechanism and the reversing mechanism for moving the tabulator bar, opening and closing the escapement mechanism, and setting the reversing mechanism into operative relation to the carriage, all in the order named, and a stop mechanism so as for timing the setting of the reverse mechanism to be subsequent to the setting of the tabulator bar and provided with releasing means responsive to the carriage on its arrival at the point determined by the tabulator bar.

24. The combination with a carriage, of propelling means for moving it throughout a determined range of travel, an escapement for normally holding the carriage against the action of its propelling means, means for releasing the carriage from the escapement for free travel in a normal or forward direction, a tabulator bar movable into operative relation to the carriage to stop its free forward travel at any predetermined point, normally inactive travel-reversing mechanism between the propelling means and the carriage, a single manipulating key with connections therefrom to the tabulator bar, the escapement mechanism and the reversing mechanism for moving the tabulator bar, opening and closing the escapement mechanism, and setting the reversing mechanism into operative relation to the carriage, all in the order named, and a stop mechanism for timing the setting of the reverse mechanism so as to be subsequent to the setting of the tabulator bar and provided with releasing means responsive to the carriage on its arrival at the point determined by the tabulator bar, and the key mechanism being provided with means for holding the parts controlled by the key in the position to which they are moved by the key.

25. The combination with a traveling carriage, of means for reversing the feed of the carriage, a tabulator bar, an operating key, operating connections between the bar and key, and operating connections between the reverse mechanism and the key having a greater range of movement than the connections between the key and bar, the last-named connections having a preliminary range of movement inactive to the reverse mechanism.

26. The combination with a traveling carriage, of an escapement mechanism therefor, a tabulator bar, and means for reversing the direction of travel of the carriage, a key, operating means from the key to the escapement mechanism, to the tabulator bar, and to the reverse mechanism, the connections between the key and the reverse mechanism having a greater range of movement than the connections to the tabulator bar and the connections to the escapement thereby causing the opening and closing of the latter before the completion of the active movement of the reverse mechanism.

27. The combination with a traveling carriage, of an escapement mechanism therefor, a tabulator bar, and means for reversing the direction of travel of the carriage, a key, operating means from the key to the escapement mechanism, to the tabulator bar, and to the reverse mechanism, the connections between the key and the reverse mechanism having a greater range of movement than the connections to the tabulator bar and the connections to the escapement, thereby causing the opening and closing of the latter before the completion of the active movement of the reverse mechanism, the connections to the escapement mechanism also being provided with a throw-off for causing the reengagement of the escapement mechanism.

28. The combination with a traveling carriage, of a tabulator bar, a reverse feeding mechanism for the carriage, a broken lever having one end related to the tabulator bar to operate the latter, and the other end related to the reverse mechanism to operate said reverse mechanism, a manipulating key for the lever, and connections between the key and that end of the lever active to the reverse mechanism.

29. The combination with a traveling carriage, of a movable tabulator bar, a reverse feeding mechanism for the carriage, an escapement mechanism for the carriage, a key, a broken lever, connections between the key and one side of the lever, and connections between the same side of the lever and both the escapement mechanism and the carriage feeding reverse mechanism, the other end of the lever being in operative relation to the tabulator bar.

30. The combination with a traveling carriage, of a movable tabulator bar, an escapement mechanism for the carriage, a carriage-feed reversing mechanism, a key, a broken lever having one arm yieldably connected to the other arm and in operative relation to the tabulator bar to move the latter, connections between the other arm of the lever and the reverse mechanism, connections between said other arm of the lever and the escapement mechanism, and connections between the key and the second named arm of the lever, the connections between the second-named arm of the lever and the escapement including throw-off means active prior to the completion of the active movement of the second-named arm of the lever.

31. The combination with a movable carriage, of a movable tabulator bar, a feed-reversing mechanism for the carriage, a key, a broken lever having one arm connected to the key and also in active relation to the reversing mechanism, and the other arm in active relation to the tabulator bar, to move it, and a stop in the path of that arm of the lever connected to the key.

32. The combination with a traveling carriage, of a movable tabulator bar, a feed-reversing mechanism for the carriage, a key, a broken lever having one arm connected to the key and the other arm in operative relation to the tabulator bar, and connections to the reversing mechanism in the path of the arm connected to the key and spaced therefrom to cause the active movement of the tabulator bar prior to the active movement of the reversing mechanism.

33. The combination with a traveling carriage, of a tabulator bar, a feed-reversing mechanism for the carriage, a key, a broken lever having one arm connected to the key and the other arm in position to engage and actively move the tabulator bar, connections between the first-named arm of the lever and the reversing mechanism spaced from the lever to cause movements of the tabulator bar and the reversing mechanism in timed relation in the order named, and movable stop means in the path of the first-named arm of the lever for preventing the full active movement of said first-named arm of the lever until the travel of the carriage in the normal direction to the extent determined by the tabulator bar has been accomplished.

34. The combination with a traveling carriage, of a movable tabulator bar, a carriage-feed reversing mechanism, an escapement mechanism for the carriage, a key, a broken lever having one arm in operative relation to the tabulator bar to cause its active movement, connections between the key and the other arm of the broken lever, operating connections for the escapement in the path of the second-named arm of the lever for opening and closing the escapement in succession, connections to the reversing mechanism also in the path of the second-named lever and spaced therefrom for action subsequent to the action of the tabulator bar, and a movable stop means in the path of the second-named lever and normally spaced therefrom to permit a preliminary movement of the lever under the action of the key and to arrest further movement of the lever until the normal travel of the carriage has been stopped by engagement with the tabulator bar.

35. The combination with a traveling carriage, of a movable tabulator bar, a carriage-feed reversing mechanism, an escapement mechanism for the carriage, a key, a broken lever having one arm in operative relation to the tabulator bar to cause its active movement, connections between the key and the other arm of the broken lever, operating connections for the escapement in the path of the second-named arm of the lever for opening and closing the escapement in succession, connections to the reversing mechanism also in the path of the second-named lever and spaced therefrom for action subsequent to the action of the tabulator bar, and a movable stop means in the path of the second-named lever and normally spaced therefrom to permit a preliminary movement of the lever under the action of the key and to arrest further movement of the lever until the normal travel of the carriage has been stopped by engagement with the tabulator bar, the connections between the escapement and the second-named arm of the lever including throw-off means releasing the escapement to move to normal position before the conclusion of the active movement of the second-named arm of the lever.

36. The combination with a traveling carriage, of a movable tabulator bar, a carriage-feed reversing mechanism, an escapement mechanism for the carriage, a key, a broken lever having one arm in operative relation to the tabulator bar to cause its active movement, connections between the key and the other arm of the broken lever, operating connections for the escapement in the path of the second-named arm of the lever for opening and closing the escapement in succession, connections to the reversing mechanism also in the path of the second-named lever and spaced therefrom for action subsequent to the action of the tabulator bar, and a movable stop means in the path of the second-named lever and normally spaced therefrom to permit a preliminary movement of the lever under the action of the key and to arrest further movement of the lever until the normal travel of the carriage has been stopped by engagement with the tabulator bar, the connections between the escapement and the second-named arm of the lever including throw-off means releasing the escapement to move to normal position before the conclusion of the active movement of the second-named arm of the lever, said throw-off mechanism comprising a spring-actuated pivoted latch dog in the path of the second-named arm of the lever, and said dog and lever being mounted to have their active movements in divergent paths.

37. The combination with a traveling carriage, of a movable tabulator bar, a carriage-feed reversing mechanism, a key, a broken lever having one arm elastically mounted and in operative relation to the tabulator bar to move the same to active position, connections between the key and the other arm of the lever, an escapement mechanism for the carriage, a broken lever in operative relation to the escapement mechanism for moving the latter to inactive position, said broken lever having a free end provided with a throw-off latch in operative relation to the second-named arm of the first-named broken lever for engagement therewith, the engaging ends of the two broken levers having divergent paths of active travel, and operating connections between the second-named arm of the first-named lever and the reversing mechanism, said last-named connections being spaced from the second-named arm of the first-named lever for engagement thereby subsequent to the active movement of the tabulator bar and the releasing movement of the escapement mechanism.

38. The combination with a traveling carriage, of a movable tabulator bar, a carriage-feed reversing mechanism, a key, a broken lever having one arm elastically mounted and in operative relation to the tabulator bar to move the same to active position, connections between the key and the other arm of the lever, an escapement mechanism for the carriage, a broken lever in operative relation to the escapement mechanism for moving the latter to inactive position, said broken lever having a free end provided with a throw-off latch in operative relation to the second-named arm of the first-named broken lever for engagement therewith, the engaging ends of the two broken levers having divergent paths of active travel, and operating connections between the second-named arm of the first-named lever and the reversing mechanism, said last-named connections being spaced from the second-named arm of the first-named lever for engagement thereby subsequent to the active movement of the tabulator bar and the releasing movement of the escapement mechanism, a movable stop member in the path of the second-named arm of the first-named lever for engaging the latter at an intermediate point in its travel, and operating connections for the stop for moving the latter out of the path of the second-named lever arm on the attainment of the carriage to the position determined by the tabulator bar.

39. The combination with a traveling carriage, of actuating means including a rack for causing traveling movements of the carriage, a forward and reverse gearing for moving the rack in one direction or the other, a carrying slide for the rack, a rock arm connected to the slide, a lever engaging the rock arm, a second lever positioned to engage the first lever, and a key connected to the second lever.

40. The combination with a traveling carriage, of actuating means including a rack for causing traveling movements of the carriage, forward and reverse gearing for moving the rack in one direction or the other, a carrying slide for the rack, a rock arm connected to the slide, a lever engaging the rock arm, a second lever positioned to engage the first lever, a key connected to the second lever, and an escapement for controlling the feed of the carriage in either direction, and a lever acting on the escapement to move it into and out of controlling relation to the carriage feed and located in the path of the second-named lever for engagement thereby prior to the engagement of the second-named lever with the lever for engaging the rock arm.

41. The combination with a traveling carriage, of actuating means including a rack for causing traveling movements of the carriage, forward and reverse gearing for moving the rack in one direction or the other, a carrying slide for the rack, a rock arm connected to the slide, a lever engaging the rock arm, a second lever positioned to engage the first lever, a key connected to the second lever, an escapement for controlling the feed of the carriage in either direction, and a lever acting on the escapement to move it into and out of controlling relation to the carriage feed and located in the path of the second-named lever for engagement thereby prior to the engagement of the second-named lever with the lever for engaging the rock arm, the lever controlling the escapement being provided with a throw-off latch at the end engaged by the second-named lever for disengagement therefrom at an intermediate point in the active travel of the said second-named lever.

42. The combination with a traveling carriage, of a rack mounted on the carriage, an escapement arbor, a pinion on the arbor in position to engage the rack, a power spring, a pulley on the arbor, and connections between the spring and pulley.

43. The combination with a traveling carriage, of a rack pendently supported therefrom and movable up and down, a pinion for driving the rack, a power spring and direct connections from the spring to the pinion, said connections including an escapement arbor on which the pinion is mounted, and a pulley also on the arbor and provided with a band connection to the spring.

45. The combination with a traveling carriage, of a rack mounted thereon for up and down movement, a pinion positioned to drive the rack, a slide carrying the rack and movable up and down to impart like motion to the rack, said rack being mounted in the slide to travel lengthwise therethrough, a rock arm connected to the slide for operating it, a key and connections between the key and the rock arm for moving the slide by movements of the key.

45. The combination with a traveling carriage, of a rack mounted thereon for up and down movements, a slide mounted for up and down movements and carrying the rack and through which the rack travels with the carriage, a rock arm connected to the slide for imparting up and down movements thereto, a lever for operating the rock arm, a second lever for operating the first lever and having a range of movement independently thereof, a key, and connections therefrom to the second-named lever.

46. The combination with a traveling carriage, of an escapement mechanism therefor, an arbor for the escapement, a pinion on the escapement arbor, a rack on the carriage in operative relation to the pinion and movable with relation to both the pinion and the carriage, means for reversely connecting the rack with the pinion, means for releasing the carriage from the escapement and reestablishing the escapement connections, and means for arresting movements of the carriage while released from the escapement and while the rack is connected with the pinion.

47. The combination with a traveling carriage, of a rack on the carriage, a driving pinion toward and from which the rack is movable, a second pinion in mesh with the first pinion and movable about the axis thereof into and out of engagement with the rack, and mechanism carrying the second pinion and movable by the rack to in turn cause the movement of the second-named pinion into and out of mesh with the rack.

48. The combination with a traveling carriage, of a driving pinion, a rack on the carriage and movable thereon into and out of mesh with the pinion, a second pinion in mesh with the first pinion and movable about the axis thereof, and a lever structure carrying the second pinion and engaged by the rack to move the second pinion into and out of engagement with the rack by the movement of the rack away from and toward the first-named pinion, said lever structure having the point of engagement with the rack closer to the pivot support of the lever structure than the pinion to accentuate the travel of the pinion with respect to the travel of the rack toward and from the first-named pinion.

49. The combination with a traveling carriage, of a rack mounted thereon and movable up and down independently of the carriage, a slide carrying the rack and through which the rack is longitudinally movable, a driving pinion toward and from which the rack is movable by the slide, a second pinion in mesh with the first pinion and linked thereto for movement about the axis thereof, a pivoted lever structure engaged by the rack and carrying the second-named pinion, said lever structure having the engagement with the rack closer to the pivot of the lever structure than the pinion to accentuate the movement of the latter by the up and down movements of the rack, a key, and operative connections between the key and the slide.

50. The combination with a traveling carriage, having a stop member thereon, of a tabulator bar movable toward and from the carriage and provided with stop means movable with the bar into and out of the path of the stop member of the carriage and yieldable lengthwise of the bar to the impact of the stop member on the carriage.

51. The combination with a traveling carriage, having a stop member thereon, of a tabulator bar having a portion yieldable lengthwise of the bar and adapted to receive stop means adjustable to different points along its length, and supports for the bar mounted for movement of the bar to carry the stop means into and out of the path of the stop member of the carriage.

52. The combination with a traveling carriage, having a stop member thereon, of a tabulator bar having an elongated portion yieldably slidable lengthwise of the bar and adapted to receive stop means adjustable to different points along its length, and pivot supports for the bar mounted for rocking movement of the bar to carry the stop means into and out of the path of the stop member on the carriage.

53. The combination with a traveling carriage, having a stop member thereon, of a tabulator bar movable toward and from the carriage in a direction lateral to the direction of travel of the carriage, said bar being provided with an elongated portion slidably mounted thereon for limited longitudinal movement and adapted to carry stop means at different points along its length for engagement by the carriage stop member, said slidable portion having means constraining it to one limit of its longitudinal movement and yieldable to the impact of the carriage stop member for movement in opposition to its normal constraint.

54. The combination with a traveling carriage, of a tabulator bar having a stop carrying portion yieldable lengthwise of the bar, direct and reverse feeding mechanism for the carriage, a single operating means for moving the tabulator bar and the reverse feeding mechanism into operative position in the order named, a movable stop means for preventing movement of the operating means to move the carriage-reversing mechanism into active position before the carriage is stopped by the tabulator bar, and connections to the movable stop in the path of the yieldable portion of the tabulator bar when in active position to cause the movement of the stop member out of the path of the operating means on the attainment of the carriage to the position determined by the tabulator bar.

55. The combination with a traveling carriage, of a tabulator bar having a stop carrying portion yieldable lengthwise of the bar, direct and reverse feeding mechanism for the carriage, a single operating means for moving the tabulator bar and the reverse feeding mechanism into operative position in the order named, a movable stop means for preventing movement of the operating means to move the carriage reversing mechanism into active position before the carriage is stopped by the tabulator bar, and connections to the movable stop in the path of the yieldable portion of the tabulator bar when in active position to cause the movement of the stop means out of the path of the operating means on the attainment of the carriage to the position determined by the tabulator bar, said stop means and connections thereto comprising a pivoted stop member, yieldable means for holding it in normal obstructing position, and a lever connected thereto and located to be in the path of the yieldable member on the tabulator bar when the latter is in active position.

56. The combination with a traveling carriage, of a tabulator, a reverse feed mechanism for the carriage, a key having connections to the tabulator and to the reverse-feed mechanism for operating them in succession by a progressive movement of the key, and means for preventing such progressive movement of the key as to actively set the reverse mechanism before the carriage has reached the limit of its forward travel determined by the active position of the tabulator.

57. The combination with a traveling carriage, of a feeding mechanism for moving the carriage in opposite directions, a tabulator, a single key for moving the tabulator to active position and for setting the carriage feeding mechanism in the reverse position, and means for holding the parts in the position to which they are actuated by the key.

58. The combination with a traveling carriage, of a feeding mechanism for moving the carriage in opposite directions, a tabulator, a single key for moving the tabulator to active position and for setting the carriage feeding mechanism in the reverse position, a latch for holding the parts in the position to which they are actuated by the key, and means for moving the latch to release parts actuated thereby for return to the initial or inactive positions.

59. The combination with a traveling carriage, of a feeding mechanism for moving the carriage in opposite directions, a tabulator bar, a single key for moving the tabulator bar to active position and for setting the feeding mechanism to cause the reverse movement of the carriage, a latch for holding the tabulator bar and the reverse mechanism in the active positions, a slide connected to the latch and provided with means constraining the slide to move the latch toward the latching position, and an operating member for the slide movable into engagement therewith to actuate it in a direction opposed to its normal constraint.

60. The combination with a traveling carriage, of a feeding mechanism for moving the carriage in opposite directions, a tabulator bar, a key lever therefor having connections to the tabulator bar and to the reverse feeding mechanism for the carriage to actuate them into active positions, a latch in position to engage over the key lever on the attainment of the lever to the limit of its active movement, a slide connected to the latch and provided with means constraining the slide to move the latch toward the latching position, and a member movable into engagement with the slide to actuate it in a direction opposed to its normal constraint to release the key lever.

61. The combination with a traveling carriage, of a feeding mechanism for moving the carriage in opposite directions, a tabulator bar, a single key connected to the tabulator bar and to the feeding mechanism for moving the bar into active position and setting the feeding mechanism to reverse the travel of the carriage, a latch for holding the tabulator bar and carriage feed reverse in the active positions, a spring-controlled slide connected at one end to the latch and normally constraining the latch to the latching position, and an operating member for the slide in position to engage the other end of the slide to move it in opposition to its normal constraint.

62. The combination with a traveling carriage, of a spring-actuated forward and reverse feeding means therefor, means for arresting the free forward movement of the carriage at any predetermined point, means for setting the reverse feeding means into active position, and means for restoring to the spring the amount of energy used in the reverse travel of the carriage.

63. The combination with a traveling carriage, of a propelling spring therefor, means for causing either a forward or reverse travel of the carriage under the action of the propelling spring, and means for restoring to the spring an amount of energy equivalent to that used in the reverse travel of the carriage on the return of the feeding means to the forward position.

64. The combination with a traveling carriage, of a propelling spring, means between the carriage and spring for impelling the carriage in a normal or forward direction, means for reversing the direction of travel of the carriage under the impelling power of the spring, and means for imparting to the spring on the return of the carriage to the forward direction of travel an amount of energy equivalent to that used in the reverse travel of the carriage.

65. The combination with a spring-impelled traveling carriage, of forward and reverse mechanism between the spring and the carriage, a rock arm, means between the spring and the rock arm connecting the latter to the spring when the carriage is connected to the spring for reverse travel for the participation of the rock arm in the reverse movements of the carriage, and means for restoring the rock arm to the initial position while connected to the spring for tensioning the spring to the extent lost in causing the reverse travel of the carriage.

66. The combination with a traveling carriage, of a propelling spring therefor, mechanism between the spring and carriage adjustable to cause the carriage to travel forwardly or reversely under the action of the spring, a rock arm, means responsive to the forward feeding mechanism for the carriage for holding the rock arm inactive, connections between the rock arm and the spring responsive to the reverse feeding mechanism for the carriage to connect the rock arm to the spring for actuation thereby, and means for returning the rock arm to the initial position on the restoration of the carriage to the forward feeding position and at the same time restore to the spring the energy expended in the reverse travel of the carriage.

67. The combination with a traveling carriage, of a propelling spring for the carriage, forward and reverse mechanism between the spring and the carriage, gearing constantly connected to the spring, a rock arm, means thereon movable into and out of engagement with the gearing, means associated with the forward and reverse mechanism and with the rock arm for connecting the rock arm to the gearing on the active setting of the reverse mechanism and disconnecting it therefrom on the active setting of the forward driving mechanism for the carriage, and means for restoring the rock arm to normal position while the reverse gearing is still active.

68. The combination with a traveling carriage, of an impelling spring therefor, a rotatable arbor, connections between the spring and the arbor for imparting rotation thereto, forward and reverse feeding mechanism for the carriage between the arbor and carriage, gearing connected to the arbor, a rock arm associated with the gearing, locking means for the rock arm associated with the forward and reverse mechanism for the carriage for holding the rock arm at one limit of its travel, means on the rock arm for connecting it to the gearing and associated with a locking means for holding it inactive at the normal position of the rock arm and releasing the connecting means to engagement with the gearing on the setting of the reverse mechanism to active position, and means for returning the rock arm to normal position after having been moved by the spring during the reverse travel of the carriage, thereby restoring to the spring the tension it had at the beginning of the reverse travel of the carriage.

69. The combination with a traveling carriage, of an impelling spring therefor, a rotatable arbor, connections between the spring and the arbor for imparting rotation thereto, forward and reverse feeding mechanism for the carriage between the arbor and carriage, gearing connected to the arbor, a rock arm associated with the gearing, locking means for the rock arm associated with forward and reverse mechanism for the carriage for holding the rock arm at one limit of its travel, means on the rock arm for connecting it to the gearing and associated with a locking means for holding it inactive at the normal position of the rock arm and releasing the connecting means to engagement with the gearing on the setting of the reverse mechanism to active position, and means for returning the rock arm to normal position after having been moved by the spring during the reverse travel of the carriage, thereby restoring to the spring the tension it had at the beginning of the reverse travel of the carriage, said last-named means having a lost motion connection with the rock arm to compensate for different extents of reverse travel of the carriage.

70. The combination with a traveling carriage, of an impelling spring therefor, an escapement arbor, connections between the spring and arbor for rotating the latter in one direction, forward and reverse driving means for the carriage between the arbor and carriage, gearing connected to the arbor, a rock arm associated with the gearing, locking means for the rock arm associated therewith and with the forward and reverse driving mechanism for the carriage and active to lock the rock arm at one limit of its travel, said rock arm also being provided with a connecting member for coupling it to the gearing and held in inactive position by the locking means at the inactive position of the rock arm, said rock arm locking to the gearing and movable therewith when the reversing means for the carriage is in active position, and lost-motion means for the rock arm for returning it to the initial inactive position and for restoring to the spring the energy consumed in driving the carriage in the reverse direction.

71. The combination with a traveling carriage, of an impelling spring therefor, an escapement arbor, connections between the spring and arbor for rotating the latter in one direction, forward and reverse driving means for the carriage between the arbor and carriage, gearing connected to the arbor, a rock arm associated with the gearing, locking means for the rock arm associated therewith and with the forward and reverse driving mechanism for the carriage and active to lock the rock arm at one limit of its travel, said rock arm also being provided with a connecting member for coupling it to the gearing and held in inactive position by the locking means at the inactive position of the rock arm, said rock arm locking to the gearing and movable therewith when the reversing means for the carriage is in the active position, and lost-motion means for the rock arm for returning it to the initial inactive position and for restoring to the spring the energy consumed in driving the carriage in the reverse direction, said lost-motion means comprising a spring constrained rock shaft having a crank arm fast thereon and a link connected at one end to the crank arm on the shaft and at the other end provided with an elongated slot, the rock arm having a projecting part engaging in the slot on the link.

72. The combination with a traveling carriage, of an impelling spring for the carriage, forward and reverse feeding mechanism for the carriage driven by the spring, a tabulator bar, a single key controlling the movements of the tabulator bar and of the reverse feeding mechanism, means for locking the key in the active position, energy restoring means for the spring, and a single means for actuating the energy restoring means and for releasing the key for the return of the parts actuated by the key to the initial position.

73. The combination with a traveling carriage, of an impelling spring for the carriage, forward and reverse feeding mechanism for the carriage driven by the spring, a tabulator bar, a single key controlling the movements of the tabulator bar and of the reverse feeding mechanism, means for locking the key in the active position, energy restoring means for the spring, and a single means for actuating the energy restoring means and for releasing the key for the return of the parts actuated by the key to the initial position, the last-named means being timed in operation to restore to the spring the energy utilized in the reverse travel of the carriage before the release of the key.

74. The combination with a traveling carriage, of an impelling spring therefor, forward and reverse mechanism between the spring and the carriage, a tabulator bar, a single key controlling the active movements of the tabulator bar and reverse mechanism, locking means for holding the key and mechanism controlled thereby in the active position, energy restoring means for the spring movable by the spring during the reverse movement of the carriage, and a single means for actuating the energy restoring means in the active direction to the initial position and to then release the key for the return of the parts controlled thereby to the initial position.

75. The combination with a traveling carriage, of an impelling spring therefor, an escapement arbor, connections between the spring and arbor, forward and reverse gearing between the arbor and carriage, other gearing connected to the arbor, a tabulator bar, a single key for moving the tabulator bar and the reverse mechanism in the order named to active position, a rock arm associated with the second-named gearing, means on the rock arm to connect it with the gearing with which it is associated, means associated with the forward and reverse gearing for the carriage for locking the rock arm in the inactive position and holding it disconnected from the gearing with which it is associated, and means for restoring the rock arm to the initial inactive position when moved therefrom by the reverse movement of the carriage, and at the same time restore to the spring energy used in the reverse travel of the carriage.

76. The combination with a traveling carriage, of an impelling spring therefor, an escapement arbor, connections between the spring and arbor, forward and reverse gearing between the arbor and carriage, other gearing connected to the arbor, a tabulator bar, a single key for moving the tabulator bar and the reversing mechanism in the order named to active position, a rock arm associated with the second-named gearing, means on the rock arm to connect it with the gearing with which it is associated, means associated with the forward and reverse gearing for the carriage for locking the rock arm in the inactive position and holding it disconnected from the gearing with which it is associated, and means for restoring the rock arm to the initial inactive position when moved therefrom by the reverse movement of the carriage, and at the same time restore to the spring energy used in the reverse travel of the carriage, said last named means comprising a lost motion device connected to the rock arm, and a manipulating member for said lost motion device and for unlatching the key irrespective of the extent of active movement of the rock arm.

77. The combination with a traveling carriage, of a spring for impelling the carriage, an arbor connected to and driven by the spring, a pinion on the arbor, a rack bar structure on the carriage in operative relation to the pinion and provided with means for connecting the rack bar structure to drive the carriage either forwardly or in the reverse direction, another pinion on the arbor, a gear wheel connected to the pinion, a rock arm movable about the axis of the gear wheel and provided with a pawl movable into and out of engagement with the gear wheel and also having a keeper adjacent to the pawl, a finger adapted to the keeper in the arm and arranged to engage the pawl to move it out of engagement with the gear wheel, a carrier for the finger in the path of the rack bar structure for movement of the finger to and from the keeper, and means for rocking the arm in opposition to its direction of travel when engaged with the gear wheel.

78. The combination with a traveling carriage, of a spring for impelling the carriage, an arbor connected to and driven by the spring, a pinion on the arbor, a rack bar structure on the carriage in operative relation to the pinion and provided with means for connecting the rack bar structure to drive the carriage either forwardly or in the reverse direction, another pinion on the arbor, a gear wheel connected to the pinion, a rock arm movable about the axis of the gear wheel and provided with a pawl movable into and out of engagement with the gear wheel, and also having a keeper adjacent to the pawl, a finger adapted to the keeper in the arm and arranged to engage the pawl to move it out of engagement with the gear wheel, a carrier for the finger in the path of the rack bar structure for movement of the finger to and from the keeper, and means for rocking the arm in opposition to its direction of travel when engaged with the gear wheel, said means including a longitudinally slotted link having sliding engagement with the arm, and means for moving the link to return the arm to initial position.

79. The combination with a traveling carriage, of an impelling spring for the carriage, mechanism associated with the spring and carriage for feeding the carriage in opposite directions, a tabulator, means for controlling the tabulator and carriage feeding mechanism, and means for restoring to the spring the energy consumed in the reverse travel only of the carriage.

80. The combination with a traveling carriage, of an impelling spring therefor, feeding mechanism between the carriage and spring for feeding the carriage in opposite directions, a tabulator, a single key for moving the tabulator and carriage reversing mechanism into active positions in succession in the order named, a lock for the key and the parts controlled thereby for holding them in active position during the reverse movement of the carriage, means for restoring to the spring the energy consumed in the reverse movement of the carriage, and a single operating means for the restoring mechanism and for releasing the key and parts controlled thereby to return to normal position, said single means being timed in operation to restore the energy to the spring before operating the lock means.

81. The combination with a traveling carriage, of an impelling spring therefor, forward and reverse mechanism between the spring and carriage for causing travel of the carriage in opposite directions, a tabulator bar, a single key for moving the tabulator bar and the reverse mechanism to active positions in succession in the order named by a single progressive movement of the key, means controlled by the carriage on reaching the position determined by the tabulator bar for preventing the setting of the reverse mechanism before the carriage has reached the limit of its forward travel permitted by the tabulator bar, a latch mechanism for holding the key and parts controlled thereby in the active position, power restoring means for the spring associated with the forward and reverse mechanism for the carriage, means associated with the forward and reverse mechanism for holding the restoring means inactive while the carriage is moving forwardly and to release it for movement with the spring while the carriage is moving reversely, means for actuating the restoring means in a direction to apply tension to the spring, and manipulating means therefor also active to the latch mechanism and timed in operation to restore the power to the spring and to release the key and parts controlled thereby in the order named.

82. The combination with a traveling carriage, of feeding mechanism for moving the carriage in opposite directions, a tabulator, a single actuating means for moving the tabulator to active position and for setting the carriage feeding mechanism in the reverse position, and means for holding the parts in the position to which they are moved by the said actuating means, said holding means being movable to cause the release of the tabulator and carriage feeding means for return to normal position.

83. The combination with a traveling carriage, of feeding mechanism for moving the carriage in opposite directions, a tabulator bar having a portion yieldable under the impact of the carriage, a single actuating means for moving the tabulator bar to active position and for setting the carriage feeding mechanism for the reverse movement of the carriage, and obstructing means in the path of the actuating means and movable out of said path by the portion of the tabulator bar yieldable to the impact of the carriage.

84. The combination with a traveling carriage, of a spring-actuated forward and reverse feeding means therefor, means for setting the reverse carriage feeding means into active position, means movable to restore to the spring an amount of energy equivalent to that used in the reverse travel of the carriage, and means active to the restoring means during the reverse travel of the carriage for setting said restoring means in a direction the reverse of that of its active movement to an extent commensurate with the reverse travel of the carriage.

In testimony, that I claim the foregoing as the invention of RALPH D. STACKPOLE, I have hereto affixed my signature in the presence of two witnesses.

ELIZABETH STACKPOLE,
*Admx. of the estate of Ralph D. Stackpole, dec'd.*

Witnesses:
F. E. KOHLER,
RUSSELL J. BURT.